United States Patent
Aramaki et al.

(10) Patent No.: US 11,974,039 B2
(45) Date of Patent: *Apr. 30, 2024

(54) IMAGE CAPTURING APPARATUS, CONTROL METHOD, AND COMPUTER-READABLE STORAGE MEDIUM

(71) Applicant: CANON KABUSHIKI KAISHA, Tokyo (JP)

(72) Inventors: Yuji Aramaki, Tokyo (JP); Tatsuya Watanabe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/065,233

(22) Filed: Dec. 13, 2022

(65) Prior Publication Data

US 2023/0117018 A1    Apr. 20, 2023

Related U.S. Application Data

(63) Continuation of application No. 17/070,075, filed on Oct. 14, 2020, now Pat. No. 11,558,540.

(30) Foreign Application Priority Data

Oct. 30, 2019  (JP) .................. 2019-197653
Mar. 30, 2020  (JP) .................. 2020-061113

(51) Int. Cl.
*H04N 23/663*    (2023.01)
*H04N 1/32*      (2006.01)
(Continued)

(52) U.S. Cl.
CPC ....... *H04N 23/663* (2023.01); *H04N 1/32545* (2013.01); *H04N 23/80* (2023.01); *H04N 2101/00* (2013.01); *H04N 2201/001* (2013.01)

(58) Field of Classification Search
None
See application file for complete search history.

(56) References Cited

U.S. PATENT DOCUMENTS

| | | |
|---|---|---|
| 8,065,458 B2 | 11/2011 | Nagao |
| 11,165,974 B2 | 11/2021 | Aramaki et al. |

(Continued)

FOREIGN PATENT DOCUMENTS

| | | |
|---|---|---|
| CN | 109660684 A | 4/2019 |
| CN | 109714523 A | 5/2019 |

(Continued)

OTHER PUBLICATIONS

Iida Mitsuru, Electronic Endoscope System and Processor for Electronic Endoscope; Feb. 24, 2011; pp. 1-10; English Translation (Year: 2011).*

(Continued)

*Primary Examiner* — Cynthia Segura
(74) *Attorney, Agent, or Firm* — Carter, DeLuca & Farrell LLP

(57) ABSTRACT

An image capturing apparatus including a mounting part capable of attaching/detaching a device capable of at least storing a captured image is provided. The image capturing apparatus obtains, if a device mounted in the mounting part has a function of executing image analysis processing for a part or a whole of an image captured by the image capturing apparatus, a processing time that is a time from a predetermined timing associated with a start of the image analysis processing to completion of the processing, if the device is caused to start executing the image analysis processing, obtains a result of the image analysis processing by accessing the device after an elapse of the processing time from the predetermined timing associated with the start.

17 Claims, 10 Drawing Sheets

(51) Int. Cl.
*H04N 23/80* (2023.01)
*H04N 101/00* (2006.01)

(56) References Cited

U.S. PATENT DOCUMENTS

| | | | |
|---|---|---|---|
| 11,388,366 | B2 | 7/2022 | Aramaki |
| 11,558,540 | B2 * | 1/2023 | Aramaki ............... H04N 5/77 |
| 2004/0085442 | A1 * | 5/2004 | Kawata ............... A61B 1/04 |
| | | | 348/E5.105 |
| 2006/0001746 | A1 | 1/2006 | Watanabe |
| 2007/0098271 | A1 * | 5/2007 | Kamata ............... H04N 19/60 |
| | | | 382/232 |
| 2019/0281193 | A1 | 9/2019 | Smilansky |
| 2020/0045243 | A1 | 2/2020 | Aramaki et al. |
| 2021/0092322 | A1 | 3/2021 | Aramaki |
| 2021/0258561 | A1 | 8/2021 | Smilansky |
| 2021/0274095 | A1 | 9/2021 | Aramaki |
| 2021/0392262 | A1 | 12/2021 | Watanabe |
| 2022/0030180 | A1 | 1/2022 | Aramaki et al. |
| 2022/0132028 | A1 | 4/2022 | Fukunaga |
| 2022/0279112 | A1 * | 9/2022 | Naito ............... H04N 23/663 |
| 2022/0311968 | A1 | 9/2022 | Aramaki |
| 2023/0164431 | A1 * | 5/2023 | Nanaumi ............ H04N 23/661 |
| | | | 348/211.1 |

FOREIGN PATENT DOCUMENTS

| | | | | |
|---|---|---|---|---|
| JP | 2003-024272 A | | 1/2003 | |
| JP | 2006-019932 A | | 1/2006 | |
| JP | 2007000315 A | * | 1/2007 | ............ H04N 5/77 |
| JP | 2007000315 A | | 1/2007 | |
| JP | 2011036488 A | * | 2/2011 | ............ H04N 5/77 |
| JP | 2011036488 A | | 2/2011 | |
| JP | 2017-205217 A | | 11/2017 | |

OTHER PUBLICATIONS

Adachi Katashi et al.; Medical Image Diagnostic Apparatus and Image Reconstruction Method; Jan. 11, 2007; pp. 1-43; English Translation (Year: 2007).*
Partial European Search Report issued by the European Patent Office dated Mar. 11, 2021 in corresponding EP Patent Application No. 20201234.0.
Redmon, J. et al., "YOLO9000: Better Faster Stronger" Computer Vision and Pattern Recognition (CVPR) arXiv: 1612.08242v1 (Dec. 2016) pp. 1-9.
Extended European Search Report issued by the European Patent Office dated Sep. 1, 2021 in corresponding EP Patent Application No. 20201234.0.
Notice of Reasons for Refusal issued by the Japanese Patent Office on Mar. 4, 2024 in corresponding JP Patent Application No. 2020-061113, with English translation.

* cited by examiner

IMAGE CAPTURING APPARATUS, CONTROL METHOD, AND COMPUTER-READABLE STORAGE MEDIUM

CROSS REFERENCE TO RELATED APPLICATIONS

This application is a continuation of U.S. patent application Ser. No. 17/070,075, filed on Oct. 14, 2020, which claims the benefit of and priority to Japanese Patent Application No. 2020-061113, filed Mar. 30, 2020, and Japanese Patent Application No. 2019-197653, filed Oct. 30, 2019, each of which is hereby incorporated by reference herein in their entirety.

BACKGROUND OF THE INVENTION

Field of the Invention

The present invention relates to a technique of presenting a processing function provided in an apparatus.

Description of the Related Art

In recent years, image processing such as image analysis of performing object detection and tracking or performing attribute estimation, and estimation of the number of objects based on the result of such image analysis is performed in various scenes using images captured by a monitoring camera. Conventionally, such image processing has been performed by transferring videos from the monitoring camera to a high performance arithmetic apparatus such as a PC or a server that executes actual image processing. However, the recent improvement of the processing capability of mobile arithmetic apparatuses allows the monitoring camera side to perform image processing. Processing on the camera side can be executed by, for example, an arithmetic apparatus arranged in a camera main body. When the arithmetic apparatus is arranged in a detachable device such as a USB, the detachable device can execute at least a part of processing.

In the apparatus on which the detachable device can be mounted, it is important to perform control of improving convenience in accordance with the presence/absence of the mounting of the detachable device.

SUMMARY OF THE INVENTION

The present invention provides a technique of improving efficiency when a detachable device is caused to execute processing in an image capturing apparatus on which the detachable device is mounted.

According to one aspect of the present invention, there is provided an image capturing apparatus including a mounting part capable of attaching/detaching a device capable of at least storing a captured image, comprising: an obtaining unit configured to, if a device mounted in the mounting part has a function of executing image analysis processing for a part or a whole of an image captured by the image capturing apparatus, obtain a processing time that is a time from a predetermined timing associated with a start of the image analysis processing to completion of the processing, and if the device is caused to start executing the image analysis processing, obtain a result of the image analysis processing by accessing the device after an elapse of the processing time from the predetermined timing associated with the start.

Further features of the present invention will become apparent from the following description of exemplary embodiments (with reference to the attached drawings).

DESCRIPTION OF THE EMBODIMENTS

Figure 1:
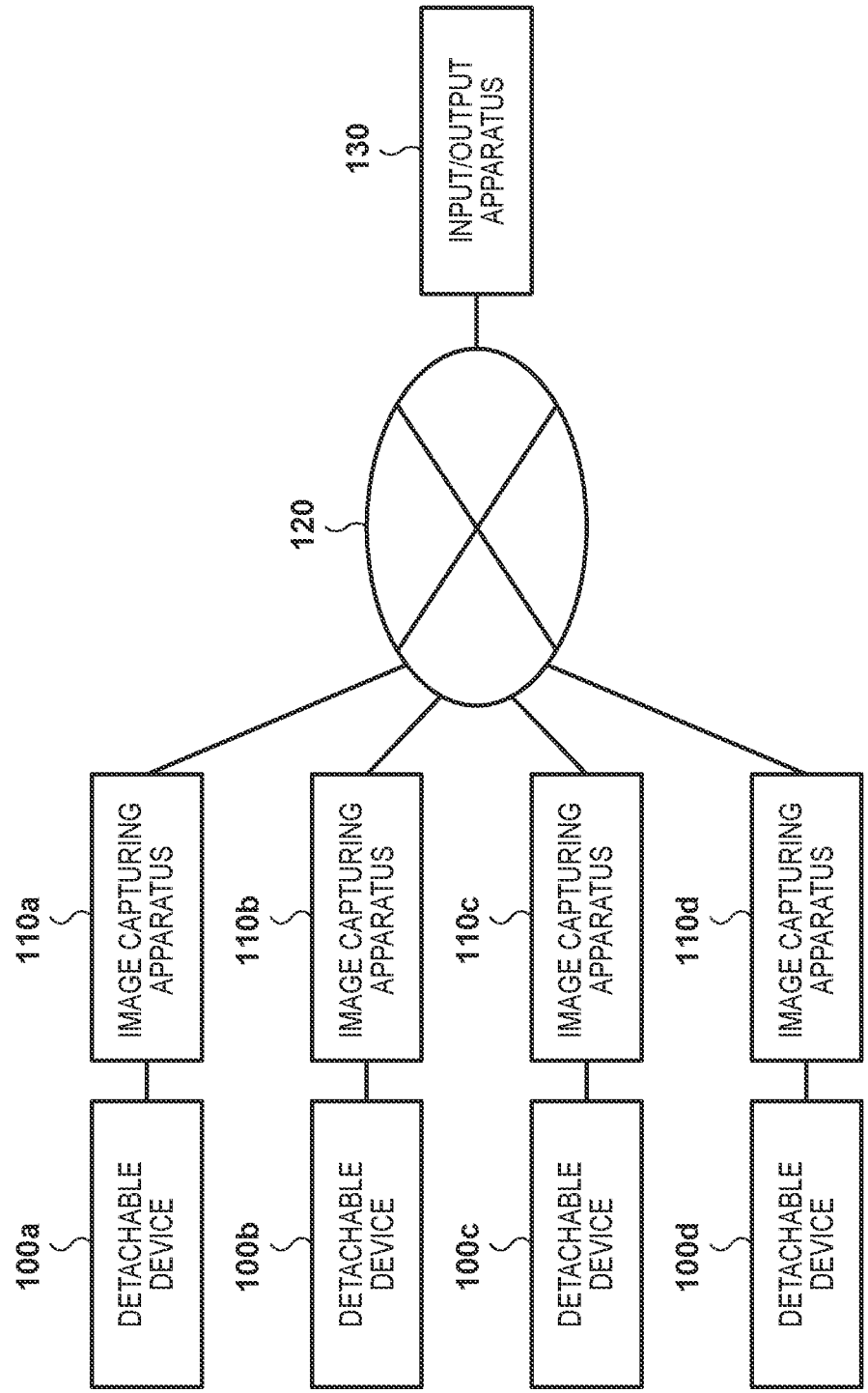
FIG. 1 is a block diagram showing an example of a system arrangement.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

<System Arrangement>

FIG. 1 shows an example of the arrangement of an image analysis system according to this embodiment. As an example, a case in which this system is a specific person tracking system will be described below. However, the present invention is not limited to this, and the following argument can be applied to an arbitrary system for analyzing an image and performing predetermined information output. This system is configured to include image capturing apparatuses 110a to 110d, a network 120, and an input/output apparatus 130. Note that the image capturing apparatuses 110a to 110d each include a slot to/from which a device capable of recording, for example, a captured image can be attached/detached, and when the detachable devices 100a to 100d are inserted into the slots, the image capturing apparatuses 110a to 110d are connected to the detachable devices 100a to 100d. Note that the detachable devices 100a to 100d will be referred to as "detachable devices 100", and the image capturing apparatuses 110a to 110d will be referred to as "image capturing apparatuses 110" hereinafter.

The detachable device 100 is an arithmetic device attachable/detachable to/from the image capturing apparatus 110. As an example, the detachable device 100 is a device with a predetermined processing circuit mounted to an SD card. The detachable device 100 is configured to be inserted as a whole into the image capturing apparatus 110 in a form of, for example, an SD card, and can therefore be configured to be connectable to the image capturing apparatus 110 without making any portion project from the image capturing apparatus 110. Alternatively, the detachable device 100 may be configured such that, for example, a half or more of it can be inserted into the image capturing apparatus 110, and may therefore be configured to be connectable to the image capturing apparatus 110 while making a portion project a little from the image capturing apparatus 110. This can prevent the detachable device 100 from interfering with an obstacle such as a wiring and raise the convenience when using the device. In addition, since an SD card slot is prepared in a lot of existing image capturing apparatuses 110 such as a network camera, the detachable device 100 can provide an extension function to the existing image capturing apparatus 110. Note that other than the form of an SD card, the detachable device 100 may be configured to be mounted to the image capturing apparatus 110 via an arbitrary interface used when mounting a storage device capable of storing an image captured by at least the image capturing apparatus 110. For example, the detachable device 100 may include a USB (Universal Serial Bus) interface, and may be configured to be mounted to a USB socket of the image capturing apparatus 110. The predetermined processing circuit is implemented by, for example, an FPGA (Field Programmable Gate Array) programmed to execute predetermined processing but may be implemented in another form.

The image capturing apparatus 110 is an image capturing apparatus such as a network camera. In this embodiment, the image capturing apparatus 110 incorporates an arithmetic apparatus capable of processing a video but is not limited to this. For example, an external computer such as a PC (Personal Computer) connected to the image capturing apparatus 110 may exist, and the combination may be handled as the image capturing apparatus 110. Additionally, in this embodiment, the detachable devices 100 are mounted in all the image capturing apparatuses 110. Note that FIG. 1 shows four image capturing apparatuses 110, and the detachable devices mounted to these. The number of combinations of devices may be three or less, or five or more. When the detachable device 100 having an image analysis processing function is mounted to the image capturing apparatus 110, video processing can be executed on the side of the image capturing apparatus 110 even if the image capturing apparatus 110 does not have the image analysis processing function. Also, in a form in which an arithmetic apparatus for video processing is arranged in the image capturing apparatus 110, as in this embodiment, image processing executable on the side of the image capturing apparatus 110 can be diversified/sophisticated by mounting the detachable device 100 including an arithmetic apparatus to the image capturing apparatus 110.

The input/output apparatus 130 is an apparatus that performs acceptance of input from a user and output of information (for example, display of information) to the user. In this embodiment, for example, the input/output apparatus 130 is a computer such as a PC, and information input/output is performed when a browser installed in the computer or a processor incorporating a native application executes the information input/output.

The image capturing apparatuses 110 and the input/output apparatus 130 are communicably connected via the network 120. The network 120 is configured to include a plurality of routers, switches, cables, and the like, which satisfy the communication standard of, for example, Ethernet °. In this embodiment, the network 120 can be an arbitrary network that enables communication between the image capturing apparatus 110 and the input/output apparatus 130, and can be constructed by an arbitrary scale and arrangement and a communication standard to comply with. For example, the network 120 can be the Internet, a wired LAN (Local Area Network), a wireless LAN, a WAN (Wide Area Network), or the like. The network 120 can be configured such that, for example, communication by a communication protocol complying with the ONVIF (Open Network Video Interface Forum) standard is possible. However, the network 120 is not limited to this and may be configured such that, for example, communication by another communication protocol such as a unique communication protocol is possible.

<Apparatus Arrangement>

(Arrangement of Image Capturing Apparatus)

Figure 2:
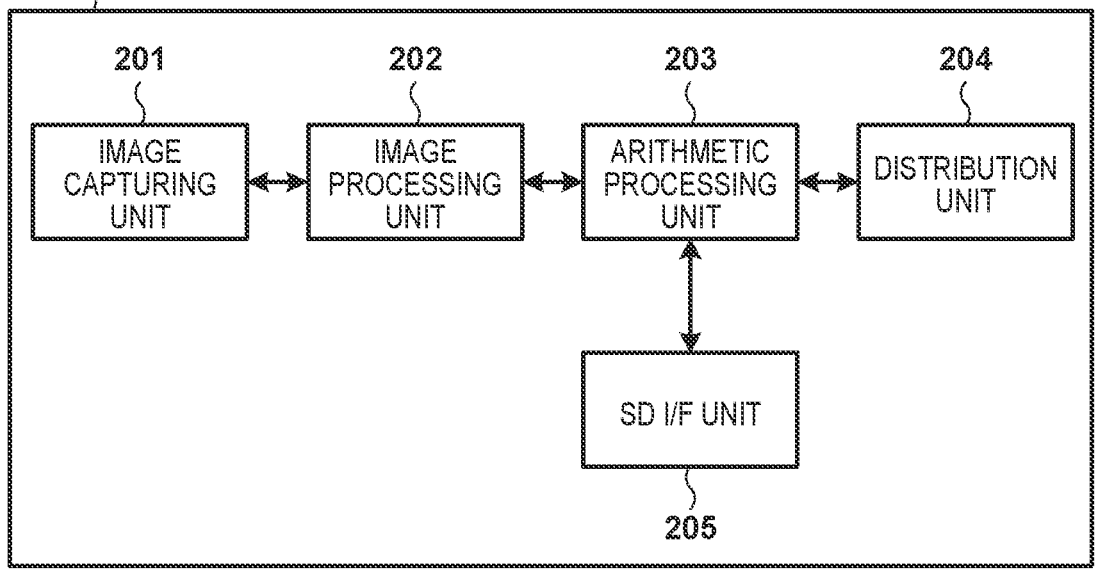
FIG. 2 is a block diagram showing an example of the hardware arrangement of an image capturing apparatus.

The arrangement of the image capturing apparatus 110 will be described next. FIG. 2 is a block diagram showing an example of the hardware arrangement of the image capturing apparatus 110. As the hardware arrangement, the image capturing apparatus 110 includes, for example, an image capturing unit 201, an image processing unit 202, an arithmetic processing unit 203, a distribution unit 204, and an SD I/F unit 205. Note that I/F is an abbreviation of interface.

The image capturing unit 201 is configured to include a lens portion configured to form an image of light, and an image capturing element that performs analog signal conversion according to the formed image of light. The lens portion has a zoom function of adjusting an angle of view, a stop function of adjusting a light amount, and the like. The image capturing element has a gain function of adjusting sensitivity when converting light into an analog signal. These functions are adjusted based on set values notified from the image processing unit 202. The analog signal obtained by the image capturing unit 201 is converted into a digital signal by an analog-to-digital conversion circuit and transferred to the image processing unit 202 as an image signal.

The image processing unit 202 is configured to include an image processing engine, and peripheral devices thereof. The peripheral devices include, for example, a RAM (Random Access Memory), the drivers of I/Fs, and the like. The image processing unit 202 performs, for example, image processing such as development processing, filter processing, sensor correction, and noise removal for the image signal obtained from the image capturing unit 201, thereby generating image data. The image processing unit 202 can also transmit set values to the lens portion and the image capturing element and execute exposure adjustment to obtain an appropriately exposed image. The image data generated by the image processing unit 202 is transferred to the arithmetic processing unit 203.

The arithmetic processing unit 203 is formed by at least one processor such as a CPU or an MPU, memories such as a RAM and a ROM, the drivers of I/Fs, and the like. Note that CPU is the acronym of Central Processing Unit, MPU is the acronym of Micro Processing Unit, RAM is the acronym of Random Access Memory, and ROM is the acronym of Read Only Memory. In an example, the arithmetic processing unit 203 can determine allocation concerning which one of the image capturing apparatus 110 and the detachable device 100 should execute each portion of processing to be executed in the above-described system, and execute processing corresponding to the allocation. Details of processing contents and processing allocation will be described later. The image received from the image processing unit 202 is transferred to the distribution unit 204 or the SD I/F unit 205. The data of the processing result or processing state is also transferred to the distribution unit 204.

The distribution unit 204 is configured to include a network distribution engine and, for example, peripheral devices such as a RAM and an ETH PHY module. The ETH PHY module is a module that executes processing of the physical (PHY) layer of Ethernet. The distribution unit 204 converts the image data or the data of the processing result or processing state obtained from the arithmetic processing unit 203 into a format distributable to the network 120, and outputs the converted data to the network 120. The SD I/F unit 205 is an interface portion used to connect the detachable device 100, and is configured to include, for example, a power supply, and a mounting part such as an attaching/detaching socket used to attach/detach the detachable device 100. Here, the SD I/F unit 205 is configured in accordance with the SD standard formulated by the SD Association. Communication between the detachable device 100 and the image capturing apparatus 110, such as transfer of an image obtained from the arithmetic processing unit 203 to the detachable device 100 or data obtaining from the detachable device 100, is performed via the SD I/F unit 205.

Figure 3:
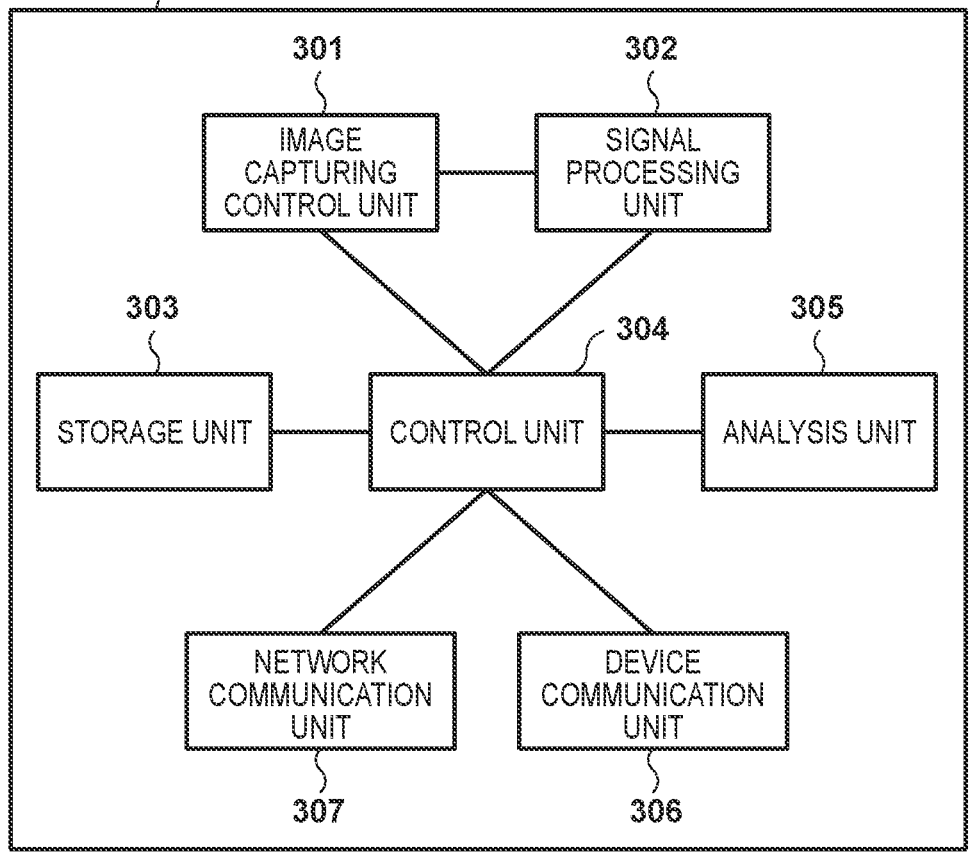
FIG. 3 is a block diagram showing an example of the functional arrangement of the image capturing apparatus.

FIG. 3 shows an example of the functional arrangement of the image capturing apparatus 110. The image capturing apparatus 110 includes, as its functions, for example, an image capturing control unit 301, a signal processing unit 302, a storage unit 303, a control unit 304, an analysis unit 305, a device communication unit 306, and a network communication unit 307.

The image capturing control unit 301 executes control of capturing the peripheral environment via the image capturing unit 201. The signal processing unit 302 performs predetermined processing for the image captured by the image capturing control unit 301, thereby generating data of the captured image. The data of the captured image will simply be referred to as the "captured image" hereinafter. The signal processing unit 302, for example, encodes the image captured by the image capturing control unit 301. The signal processing unit 302 performs encoding for a still image using, for example, an encoding method such as JPEG (Joint Photographic Experts Group). The signal processing unit 302 performs encoding for a moving image using an encoding method such as H.264/MPEG-4 AVC (to be referred to as "H.264" hereinafter) or HEVC (High Efficiency Video Coding). The signal processing unit 302 may encode an image using an encoding method selected by the user from a plurality of encoding methods set in advance via, for example, an operation unit (not shown) of the image capturing apparatus 110.

The storage unit 303 stores a list (to be referred to as a "first processing list" hereinafter) of analysis processing executable by the analysis unit 305 and a list of post-processes for a result of analysis processing. The storage unit 303 also stores a result of analysis processing to be described later. Note that in this embodiment, processing to be executed is analysis processing. However, arbitrary processing may be executed, and concerning processing associated with the processing to be executed, the storage unit 303 may store the first processing list and the list of post-processes. The control unit 304 controls the signal processing unit 302, the storage unit 303, the analysis unit 305, the device communication unit 306, and the network communication unit 307 to execute predetermined processing.

The analysis unit 305 selectively executes at least one of pre-analysis processing, analysis processing, and post-analysis processing to be described later for a captured image. Pre-analysis processing is processing to be executed for a captured image before analysis processing to be described later is executed. In the pre-analysis processing according to this embodiment, as an example, processing of dividing a captured image to create divided images is executed. Analysis processing is processing of outputting information obtained by analyzing an input image. In the analysis processing according to this embodiment, as an example, processing of receiving a divided image obtained by pre-analysis processing, executing at least one of human body detection processing, face detection processing, and vehicle detection processing, and outputting the analysis processing result is executed. The analysis processing can be processing configured to output the position of an object in a divided image using a machine learning model that has learned to detect an object included in an image using, for example, the technique in J. Redmon and A. Farhadi "YOLO9000: Better Faster Stronger" Computer Vision and Pattern Recognition (CVPR) 2016. Post-analysis processing is processing to be executed after analysis processing is executed. In the post-analysis processing according to this embodiment, as an example, processing of outputting, as a processing result, a value obtained by adding the numbers of objects detected in the divided images based on the analysis processing result for each divided image is executed. Note that the analysis processing may be processing of detecting an object in an image by performing pattern matching and outputting the position of the object.

The device communication unit 306 performs communication with the detachable device 100. The device communication unit 306 converts input data into a format processible by the detachable device 100, and transmits data obtained by the conversion to the detachable device 100. In addition, the device communication unit 306 receives data from the detachable device 100, and converts the received data into a format processible by the image capturing apparatus 110. In this embodiment, as the conversion processing, the device communication unit 306 executes processing of converting a decimal between a floating point format and a fixed point format. However, the present invention is not limited to this, and another process may be executed by the device communication unit 306. Additionally, in this embodiment, the device communication unit 306 transmits a command sequence determined in advance within the range of the SD standard to the detachable device 100, and receives a response from the detachable device 100, thereby performing communication with the detachable device 100. The network communication unit 307 performs communication with the input/output apparatus 130 via the network 120.

(Arrangement of Detachable Device)

Figure 4:
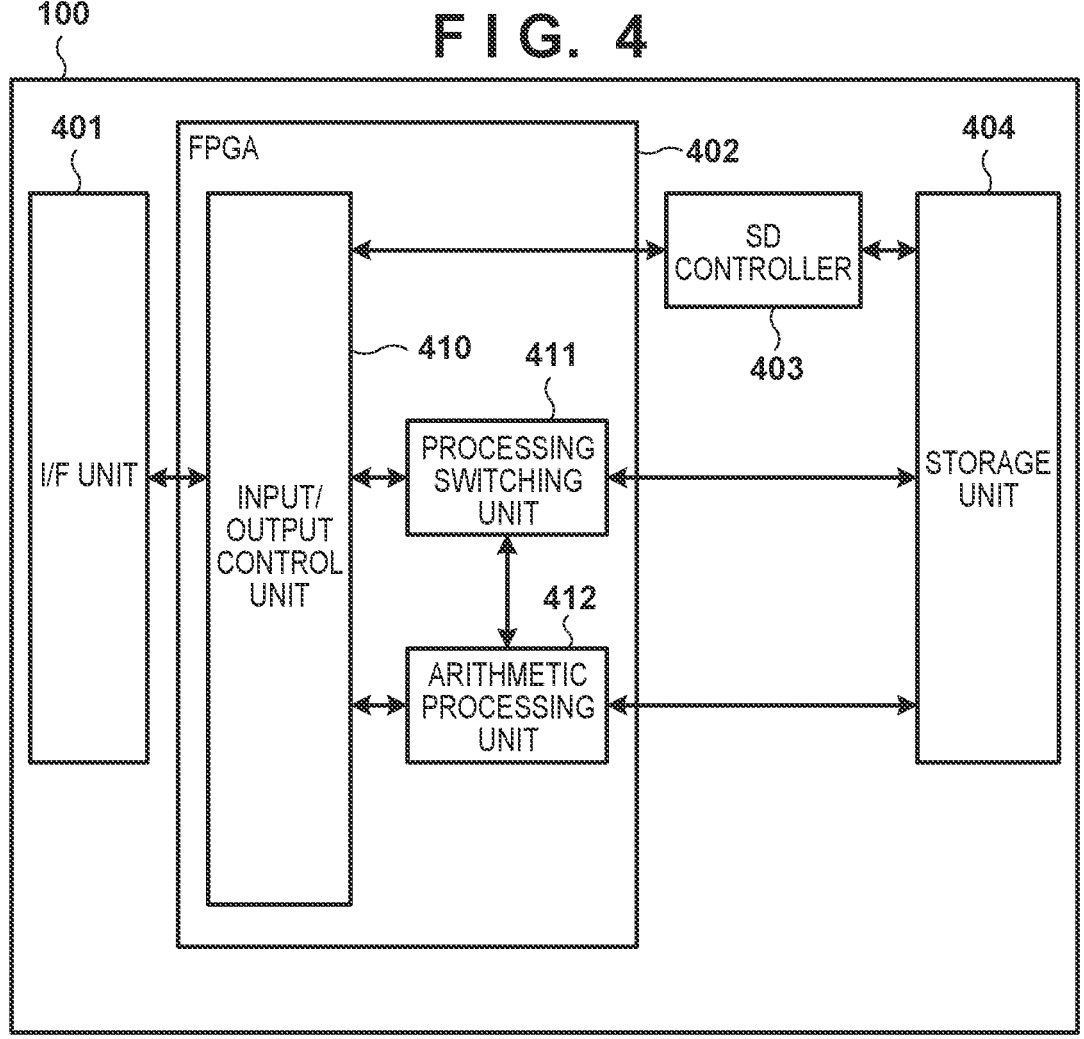
FIG. 4 is a block diagram showing an example of the hardware arrangement of a detachable device.

FIG. 4 is a block diagram showing an example of the hardware arrangement of the detachable device 100. As an example, the detachable device 100 is configured to include an I/F unit 401, an FPGA 402, an SD controller 403, and a storage unit 404. The detachable device 100 is formed into a shape that can be inserted/removed into/from the attaching/detaching socket of the SD I/F unit 205 provided in the image capturing apparatus 110, that is, a shape complying with the SD standard.

The I/F unit 401 is an interface portion used to connect an apparatus such as the image capturing apparatus 110 and the detachable device 100. The I/F unit 401 is configured to include, for example, an electrical contact terminal that receives supply of power from the image capturing apparatus 110 and generates and distributes a power supply to be used in the detachable device 100, and the like. Concerning items defined in (complying with) the SD standard, the I/F unit 401 complies with that, like the SD I/F unit 205 of the image capturing apparatus 110. Reception of images and setting data from the image capturing apparatus 110 and transmission of data from the FPGA 402 to the image capturing apparatus 110 are executed via the I/F unit 401.

The FPGA 402 is configured to include an input/output control unit 410, a processing switching unit 411, and an arithmetic processing unit 412. The FPGA 402 is a kind of semiconductor device capable of repetitively reconstructing an internal logic circuit structure. By processing implemented by the FPGA 402, a processing function can be added (provided) to the apparatus in which the detachable device 100 is mounted. Additionally, since the logic circuit structure can be changed later by the reconstruction function of the FPGA 402, when the detachable device 100 is mounted to, for example, an apparatus in a field of a quickly advancing technology, appropriate processing can be executed in the apparatus at an appropriate timing. Note that in this embodiment, an example in which an FPGA is used will be described. However, for example, a general-purpose ASIC or a dedicated LSI may be used if processing to be described later can be executed. The FPGA 402 is activated by writing, from a dedicated I/F, setting data including the information of a logic circuit structure to be generated or reading out the setting data from the dedicated I/F. In this embodiment, the setting data is held in the storage unit 404. When powered on, the FPGA 402 reads out the setting data from the storage unit 404 and generates and activates a logic circuit. However, the present invention is not limited to this. For example, the image capturing apparatus 110 may write the setting data in the FPGA 402 via the I/F unit 401 by implementing a dedicated circuit in the detachable device.

The input/output control unit 410 is configured to include a circuit used to transmit/receive an image to/from the image capturing apparatus 110, a circuit that analyzes a command received from the image capturing apparatus 110, a circuit that controls based on a result of analysis, and the like. Commands here are defined by the SD standard, and the input/output control unit 410 can detect some of them. Details of the functions will be described later. The input/output control unit 410 controls to transmit an image to the SD controller 403 in storage processing and transmit an image to the arithmetic processing unit 412 in image analysis processing. If the setting data of switching of processing is received, the input/output control unit 410 transmits the setting data to the processing switching unit 411. The processing switching unit 411 is configured to include a circuit configured to obtain the information of the image analysis processing function from the storage unit 404 based on the setting data received from the image capturing apparatus 110 and write the information in the arithmetic processing unit 412. The information of the image analysis processing function includes setting parameters representing, for example, the order and types of operations processed in the arithmetic processing unit 412, the coefficients of the operations, and the like. The arithmetic processing unit 412 is configured to include a plurality of arithmetic circuits needed to execute the image analysis processing function. The arithmetic processing unit 412 executes each arithmetic processing based on the information of the image analysis processing function received from the processing switching unit 411, transmits the processing result to the image capturing apparatus 110, and/or records the processing result in the storage unit 404. As described above, the FPGA 402 extracts the setting data of an execution target processing function included in setting data corresponding to a plurality of processing functions held in advance, and rewrites processing contents to be executed by the arithmetic processing unit 412 based on the extracted setting data. This allows the detachable device 100 to selectively execute at least one of the plurality of processing functions. In addition, by appropriately adding setting data of processing to be newly added, latest processing can be executed on the side of the image capturing apparatus 110. Note that holding a plurality of setting data corresponding to a plurality of processing functions will be referred to as holding a plurality of processing functions hereinafter. That is, even in a state in which the FPGA 402 of the detachable device 100 is configured to execute one processing function, if the processing contents of the arithmetic processing unit 412 can be changed by setting data for another processing function, this will be expressed as holding a plurality of processing functions.

The SD controller 403 is a known control IC (Integrated Circuit) as defined by the SD standard, and executes control of a slave operation of an SD protocol and control of data read/write for the storage unit 404. The storage unit 404 is formed by, for example, a NAND flash memory, and stores various kinds of information such as storage data written from the image capturing apparatus 110, the information of the image analysis processing function written in the arithmetic processing unit 412, and setting data of the FPGA 402.

Figure 5:
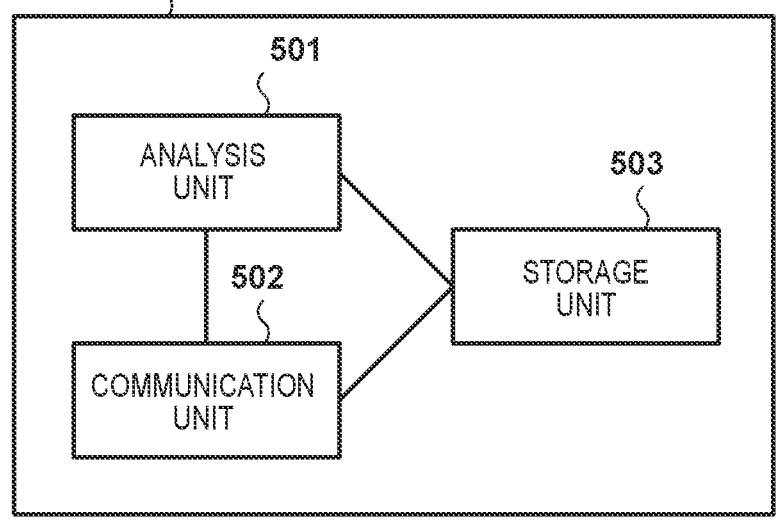
FIG. 5 is a block diagram showing an example of the functional arrangement of the detachable device.

FIG. 5 shows an example of the functional arrangement of the detachable device 100. The detachable device 100 includes, as its functional arrangement, for example, an analysis unit 501, a communication unit 502, and a storage unit 503. The analysis unit 501 executes analysis processing for an image. For example, if an analysis processing setting request is input, the analysis unit 501 executes setting to set the input analysis processing in an executable state. If an image is input, the analysis unit 501 executes the analysis processing set in the executable state for the input image. In this embodiment, executable analysis processing includes human body detection processing and face detection processing but is not limited to these. For example, it may be processing (face authentication processing) of determining whether a person stored in advance is included in an image. For example, if the degree of matching between the image characteristic amount of a person stored in advance and the image characteristic amount of a person detected from an input image is calculated, and the degree of matching is equal to or larger than a threshold, it is determined that the person is the person stored in advance. Alternatively, it may be processing of superimposing a predetermined mask image or performing mosaic processing on a person detected from an input image for the purpose of privacy protection. It may be processing of detecting, using a learning model that has learned a specific action of a person by machine learning, whether a person in an image is taking the specific action. Furthermore, it may be processing of determining what kind of region a region in an image is. It may be processing of determining, using, for example, a learning model that has learned buildings, roads, persons, sky and the like by machine learning, what kind of region a region in an image is. As described above, executable analysis processing can be applied to both image analysis processing using machine learning and image analysis processing without using machine learning. Each analysis processing described above may be executed not independently by the detachable device 100 but in cooperation with the image capturing apparatus 110. The communication unit 502 performs communication with the image capturing apparatus 110 via the I/F unit 401. The storage unit 503 stores information such as the setting contents of analysis processing and a time required for analysis processing. The time required for analysis processing is, for example, an actual time needed when executing predetermined processing, and can be a time that guarantees the end of analysis processing by waiting for the time. Alternatively, the time required for analysis processing may be the number of clock cycles of processing in the analysis processing. Note that the information of the time can be stored individually for each analysis processing. In addition, the time required for analysis processing may be set to, for example, a sufficiently large initial value, the time needed when actually executing the processing may be collected as a statistic value, and the initial value may be updated based on the collected value.

<Procedure of Processing>

An example of the procedure of processing executed in the system will be described next. Note that processing executed by the image capturing apparatus 110 in the following processes is implemented by, for example, by a processor in the arithmetic processing unit 203, executing a program stored in a memory or the like. However, this is merely an example, and processing to be described later may partially or wholly be implemented by dedicated hardware. In addition, processing executed by the detachable device 100 or the input/output apparatus 130 may also be implemented by, by a processor in each apparatus, executing a program stored in a memory or the like, and processing may partially or wholly be implemented by dedicated hardware.

(Overall Procedure)

Figure 6:
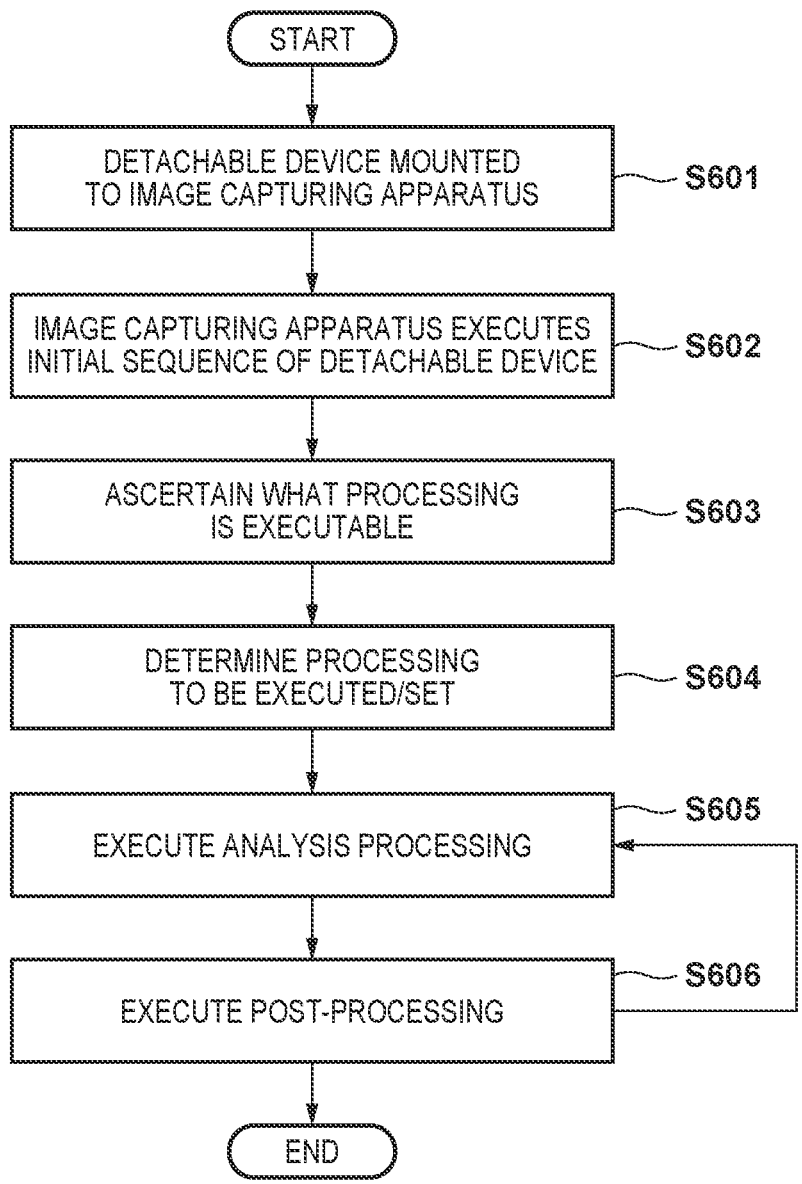
FIG. 6 is a flowchart showing an example of the procedure of processing executed by the system.

FIG. 6 schematically shows a series of procedures of image analysis processing executed by the system. In this processing, first, the user mounts the detachable device 100 to the image capturing apparatus 110 (step S601). The image capturing apparatus 110 executes an initialization sequence of the detachable device 100 (step S602). In this initialization sequence, predetermined commands are transmitted/received between the image capturing apparatus 110 and the detachable device 100, and the image capturing apparatus 110 is thus set in a state in which it can use the detachable device 100. After that, the image capturing apparatus 110 ascertains what processing is executable by the detachable device 100, and ascertains what processing scan be executed locally (can be executed only by the image capturing apparatus 110 or by the combination of the image capturing apparatus 110 and the detachable device 100) (step S603). Note that although the detachable device 100 can be configured to execute arbitrary processing, processing irrelevant to processing that should be executed on the side of the image capturing apparatus 110 need not be taken into consideration. In an example, the image capturing apparatus 110 may hold a list of executable processes, which is obtained in advance from, for example, the input/output apparatus 130. In this case, when obtaining, from the detachable device 100, information representing processing executable by the detachable device 100, the image capturing apparatus 110 can ascertain the executable processing depending on whether the processing is included in the list. Next, the image capturing apparatus 110 determines processing to be executed, and executes setting of the detachable device 100 as needed (step S604). That is, if at least part of processing determined as an execution target is to be executed by the detachable device 100, setting of the detachable device 100 for the processing is executed. In this setting, for example, reconstruction of the FPGA 402 using setting data corresponding to the processing of the execution target can be performed. Then, the image capturing apparatus 110 or the detachable device 100 executes analysis processing (step S605). After that, the image capturing apparatus 110 executes post-processing (step S606). Note that the processes of steps S605 and S606 are repetitively executed. The processing shown in FIG. 6 is executed when, for example, the detachable device 100 is mounted. However, at least part of the processing shown in FIG. 6 may repetitively be executed such that, for example, the process of step S603 is executed again when the detachable device 100 is detached.

(Processing for Ascertaining What Processing is Executable)

Figure 7:
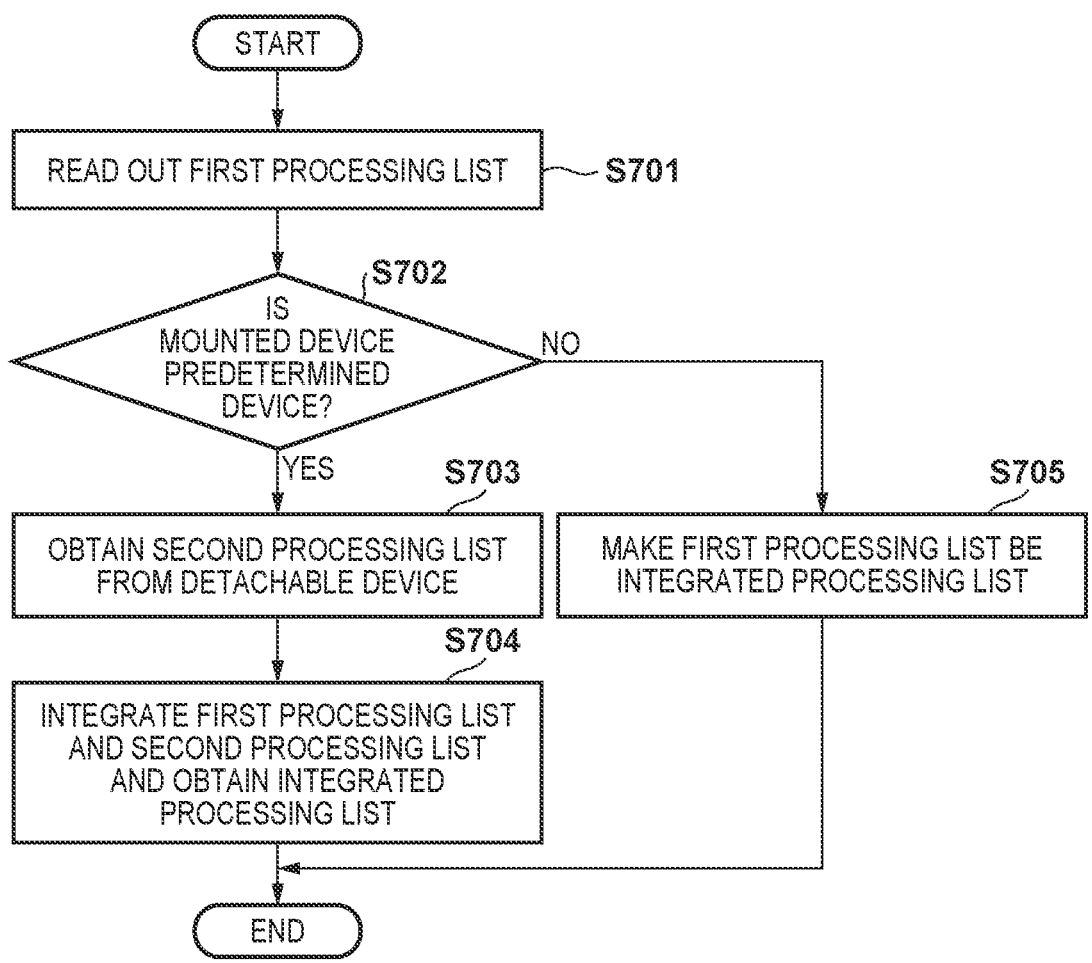
FIG. 7 is a flowchart showing an example of the procedure of processing for ascertaining what analysis processing is executable.

FIG. 7 shows an example of the procedure of processing of ascertaining what processing is executable by the image capturing apparatus 110. This processing corresponds to the process of step S603 in FIG. 6, and can be executed if a device such as the detachable device 100 is mounted to the image capturing apparatus 110 or removed, or if the image capturing apparatus 110 is powered on. In this processing, the image capturing apparatus 110 reads out processing executable by the detachable device 100, integrates it with analysis processing executable by the image capturing apparatus 110 itself, and ascertains what analysis processing is executable on the side of the image capturing apparatus 110.

First, the control unit 304 of the image capturing apparatus 110 reads out a first processing list that is a list of processes executable by the analysis unit 305 of the image capturing apparatus 110 itself, which is stored in the storage unit 303 (step S701). Next, the control unit 304 determines whether the mounted device is, for example, a conventional device having only a storage function or a predetermined device such as the detachable device 100 having a specific processing function (step S702). For example, the control unit 304 controls the device communication unit 306 to issue a read request (read command) for a specific address to the mounted device and read out flag data stored at the specific address. The control unit 304 can determine, based on the read flag data, whether the detachable device 100 is a predetermined device having a specific processing function. However, this is merely an example, and it may be determined by another method whether the mounted device is a predetermined device.

If the mounted device is a predetermined device (YES in step S702), the control unit 304 executes processing for ascertain what processing is executable in the device (detachable device 100). The control unit 304 controls the device communication unit 306 to communicate with detachable device 100 and obtain a list (to be referred to as a "second processing list" hereinafter) of processes executable in the detachable device 100 (step S703). The control unit 304 reads out the data stored at the specific address as in a case in which, for example, it is determined whether the detachable device 100 is a predetermined device, thereby obtaining the second processing list. Note that, for example, the second processing list can be stored at the same address as the flag data used to determine whether the detachable device is a predetermined device. In this case, the image capturing apparatus 110 can simultaneously execute the process of step S702 and the process of step S703 by accessing the address and simultaneously obtaining the flag data and the second processing list. However, the present invention is not limited to this, and these data may be stored at different addresses. After that, the control unit 304 creates an integrated processing list in which the first processing list of processes executable by the image capturing apparatus 110 itself, which is read out from the storage unit 303, and the second processing list obtained from the detachable device are integrated (step S704), and ends the processing.

The integrated processing list represents a list of processes locally executable on the side of the image capturing apparatus 110 without performing processing by an apparatus such as a server apparatus on the network. Note that in this embodiment, the integrated processing list is a list obtained by the union of the processes included in the first processing list and the processes included in the second processing list. The integrated processing list is the list of processes included in at least one of the first processing list and the second processing list. However, the present invention is not limited to this. For example, if another process can be executed by combining a process included in the first processing list and a process included in the second processing list, the other executable processing may be added to the integrated processing list.

If the mounted device is not a predetermined device (NO in step S702), the control unit 304 determines that there is no processing executable by the mounted device. Hence, the control unit 304 sets the first processing list of processes executable by the self-apparatus, which is read out from the storage unit 303, as the integrated processing list representing processes locally executable on the side of the image capturing apparatus 110 (step S705), and ends the processing. Note that when the processing shown in FIG. 7 is executed at the time of device removal, the predetermined device is not mounted, as a matter of course, and therefore, the first processing list is handled as the integrated processing list.

This makes it possible to form a list of processes locally executable on the side of the image capturing apparatus 110 based on whether the detachable device 100 capable of executing specific processing is mounted in the image capturing apparatus 110. In addition, when the integrated processing list is presented to the user, as will be described later, the user can select processing that becomes locally executable on the side of the image capturing apparatus 110 by the mounting of the detachable device 100.

(Processing of Determining Analysis Processing Contents)

Figure 8:
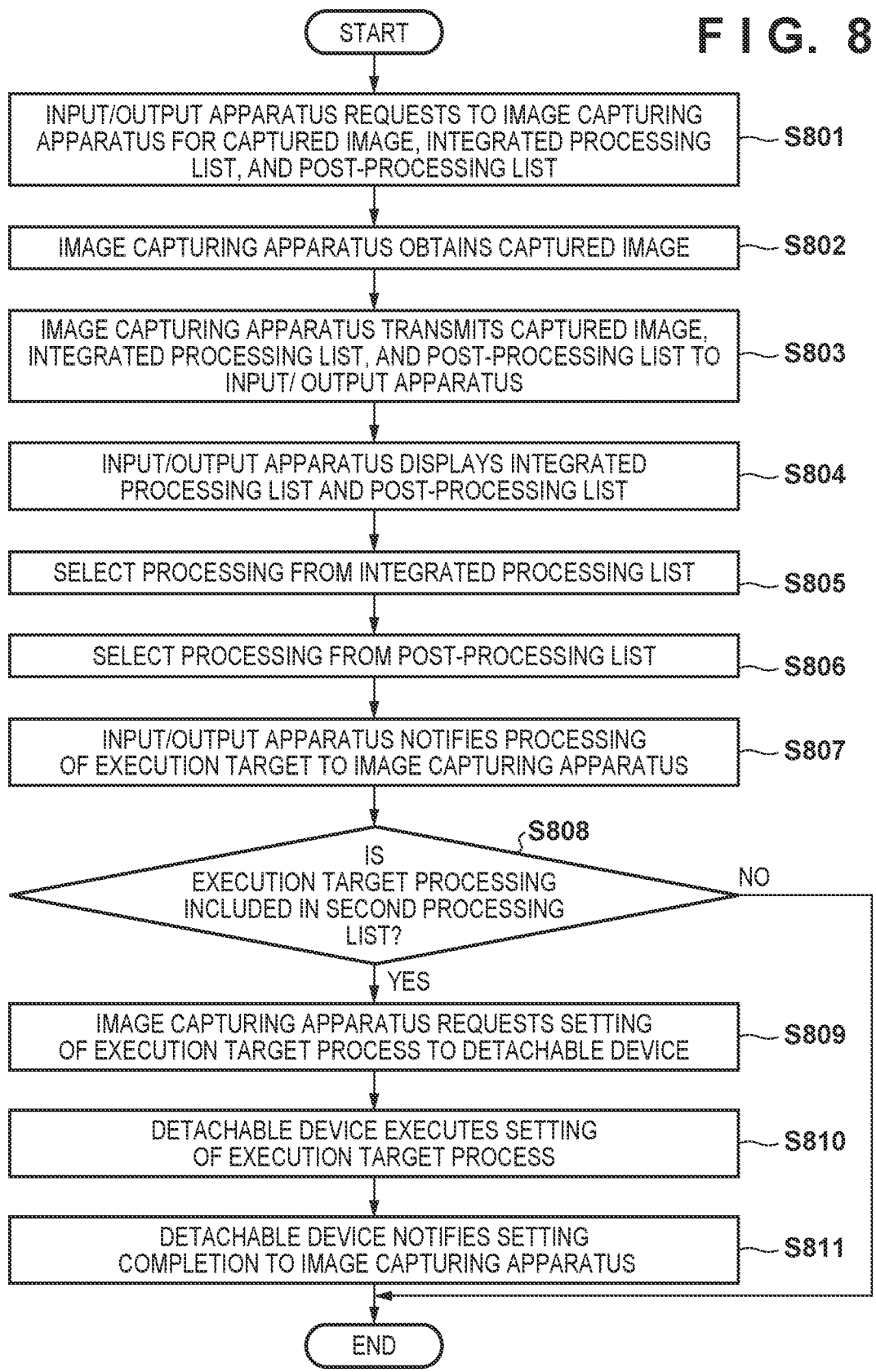
FIG. 8 is a flowchart showing an example of the procedure of processing of determining the contents of analysis processing.

FIG. 8 shows an example of the procedure of processing of determining analysis processing contents by the image capturing apparatus 110. In this processing, analysis processing locally executable on the side of the image capturing apparatus 110 is presented to the user via the input/output apparatus 130, and the input/output apparatus 130 accepts selection of the user. The image capturing apparatus 110 determines analysis processing to be executed in accordance with information representing the user selection accepted via the input/output apparatus 130.

In this processing, first, the input/output apparatus 130 executes communication with the image capturing apparatus 110 and requests obtaining of a captured image, an integrated processing list, and a post-processing list (step S801). As an example, the input/output apparatus 130 transmits a request message defined by the ONVIF standard to the image capturing apparatus 110, thereby requesting transmission of information to the image capturing apparatus 110. However, the present invention is not limited to this, and the information transmission request may be done by another message or the like. In the image capturing apparatus 110, based on the request, the image capturing control unit 301 captures the peripheral environment, and the control unit 304 controls the signal processing unit 302 to process an image captured by the image capturing control unit 301 and obtain a captured image (step S802). Note that the image capturing apparatus 110 may capture the peripheral environment independently of the presence/absence of the request and continuously obtain a captured image. The image capturing apparatus 110 may locally store the captured image or transfer the captured image to another apparatus such as a network server and store. The control unit 304 reads out a post-processing list stored in the storage unit 303. In this embodiment, the post-processing list includes display processing and storage processing but is not limited to this. The control unit 304 controls the network communication unit 307 to transmit the post-processing list, an integrated processing list obtained by the processing shown in FIG. 7, and the captured image obtained in step S802 to the input/output apparatus 130 (step S803). As an example, the image capturing apparatus 110 transmits a response message to the request message defined by the above-described ONVIF standard to the input/output apparatus 130, thereby transmitting the information to the input/output apparatus 130. However, the present invention is not limited to this, and the information may be transmitted by another message or the like. Note that only processing to be executed may be taken into consideration here, and the captured image request by the input/output apparatus 130 in step S801, the captured image obtaining in step S802, and captured image transmission to the input/output apparatus 130 in step S803 may not be performed.

The input/output apparatus 130 receives the captured image, the integrated processing list, and the post-processing list from the image capturing apparatus 110. The input/output apparatus 130 presents the integrated processing list and the post-processing list to the user by screen display or the like (step S804). Note that at this time, the input/output apparatus 130 may also present the captured image to the user by screen display or the like. After that, the user confirms the displayed integrated processing list and post-processing list, and selects analysis processing to be executed (to be referred to as "execution target processing" hereinafter) from the integrated processing list (step S805). In addition, the user selects post-processing to be executed (to be referred to as "execution target post-processing" hereinafter) (step S806). The input/output apparatus 130 transmits information representing the selection result of the execution target processing and the execution target post-processing to the image capturing apparatus 110 (step S807).

The control unit 304 of the image capturing apparatus 110 controls the network communication unit 307 to receive the information representing the execution target processing selected by the user from the input/output apparatus 130 and determine whether the execution target processing is processing included in the second processing list (step S808). If the execution target processing is not included in the second processing list (NO in step S808), the control unit 304 ends the processing shown in FIG. 8 without making a notification to the detachable device 100 to execute the processing in the image capturing apparatus 110. On the other hand, if the execution target processing is included in the second processing list (YES in step S808), the control unit 304 controls the device communication unit 306 to transfer an execution target processing setting request to the detachable device 100 (step S809).

The communication unit 502 of the detachable device 100 receives the execution target processing setting request from the image capturing apparatus 110. The communication unit 502 outputs the execution target processing setting request received from the image capturing apparatus 110 to the analysis unit 501. Based on the execution target processing setting request input from the communication unit 502, the analysis unit 501 obtains settings of the execution target processing from the storage unit 503, and executes setting to set the detachable device 100 in a state in which the execution target processing can be executed (step S810). For example, after the completion of the setting processing, the communication unit 502 transmits a setting completion notification to the image capturing apparatus 110 (step S811). Note that the communication unit 502 need only notify information for inhibiting the image capturing apparatus 110 from writing data at a timing at which the setting of the detachable device 100 is not completed yet, and may notify the image capturing apparatus 110 of the information of the setting completion timing or the like before the setting is actually completed. The control unit 304 of the image capturing apparatus 110 controls the device communication unit 306 to receive the setting completion notification from the detachable device 100.

The setting completion notification from the detachable device 100 to the image capturing apparatus 110 can be executed using, for example, one of the following three methods. In the first notification method, the communication unit 502 outputs a BUSY signal in a case in which the setting of the execution target processing has not ended at the time of write processing of the data of the first block from the image capturing apparatus 110. Output of the BUSY signal is performed by, for example, driving a signal line of DATA defined by the SD standard to a Low state. In this case, the image capturing apparatus 110 confirms the BUSY signal, thereby discriminating whether the setting of the execution target processing is completed. In the second notification method, the time until setting of the execution target processing is completed is stored in advance at the above-described specific address, and the image capturing apparatus 110 reads out the information of the time until the setting completion. After the elapse of the time until the execution target processing setting completion, the image capturing apparatus 110 outputs write data (issues a write command). This allows the image capturing apparatus 110 to transmit the data of the captured image after the setting of the execution target processing is completed. In the third notification method, when the setting of the execution target processing is completed, the analysis unit 501 writes a setting completion flag at a second specific address of the detachable device 100. The image capturing apparatus 110 reads out the data at the second specific address, thereby discriminating whether the setting of the execution target processing is completed. Note that the information of the address at which the setting completion flag is written may be stored at the above-described specific address or may be stored at another address.

(Execution Control of Analysis Processing)

Figure 9:
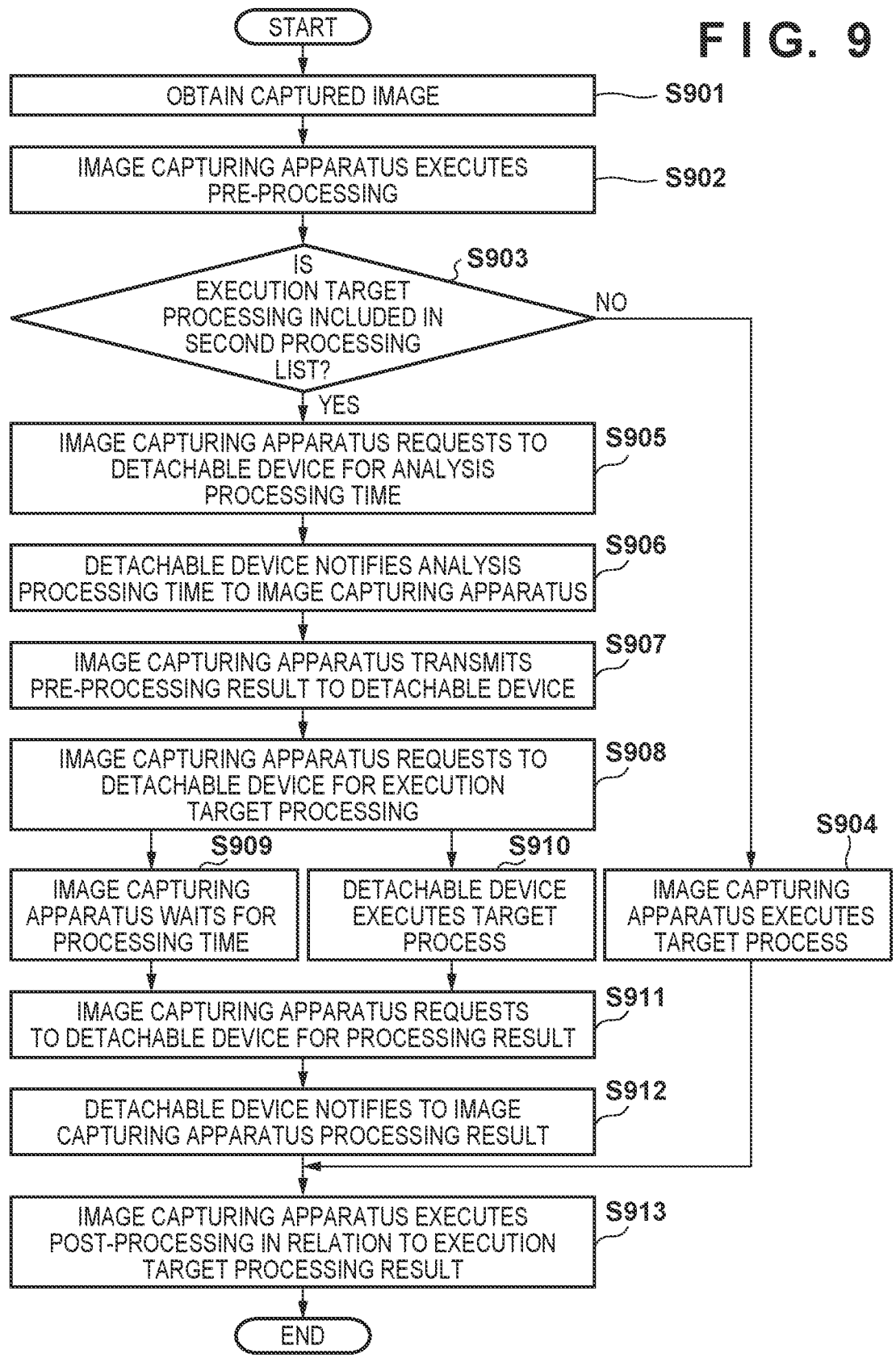
FIG. 9 is a flowchart showing an example of the procedure of control of executing analysis processing.

FIG. 9 shows an example of the procedure of control when the image capturing apparatus 110 executes analysis processing. In this processing, first, the image capturing control unit 301 captures the peripheral environment (step S901). The control unit 304 controls the signal processing unit 302 to process an image captured by the image capturing control unit 301 and obtain a captured image. After that, the control unit 304 controls the analysis unit 305 to execute pre-analysis processing for the captured image input from the control unit 304 and obtain the image of the pre-analysis processing result (step S902). The control unit 304 determines whether the execution target processing is included in the second processing list (step S903).

Upon determining that the execution target processing is not included in the second processing list (NO in step S903), the control unit 304 controls the analysis unit 305 to execute the execution target processing for the image of the pre-analysis processing result in the image capturing apparatus 110 (step S904). The control unit 304 controls the analysis unit 305 to execute post-analysis processing for the analysis processing result (step S913), and ends the processing.

If the execution target processing is included in the second processing list (YES in step S903), the control unit 304 controls the device communication unit 306 to request, from the detachable device 100, an analysis processing time that is the time from the execution target processing execution request to completion of the processing (step S905). Note that the analysis processing time will sometimes be referred to as a "processing time" hereinafter. Upon receiving the processing time request, the communication unit 502 of the detachable device 100 transmits the information of the processing time read out from the storage unit 503 to the image capturing apparatus 110 (step S906). Note that in this embodiment, for example, the information of the processing time can be stored at the address that the control unit 304 has accessed in step S702 to determine whether the detachable device 100 is a predetermined device. Note that the information of the processing time may be stored at another address of the storage unit 503. For example, the control unit 304 of the image capturing apparatus 110 can send a read request (read command) to the address at which the information of the processing time is stored and obtain the information of the processing time as a response to the request. The information of a processing time is stored for each processing, and the image capturing apparatus 110 is notified of a processing time associated with execution target processing designated by the image capturing apparatus 110.

Alternatively, for example, the processing time may be calculated as the product $N/(f \times k)$ of an operating frequency f, a multiplication value k (by, for example, a phase locked loop circuit (PLL)), and the number N of clock cycles from the request to the end of analysis processing. In an example, if the operating frequency f is 5 MHz, k is 2, and N is 100,000, $10^5/(5 \times 10^6 \times 2) = 10^{-2}$ [sec], and the processing time is calculated as 10 msec. For example, as the information representing the performance, the control unit 304 can obtain the information of the operating frequency by reading out information stored in the storage unit 503 or from the arithmetic processing unit 203 of hardware. Note that the image capturing apparatus 110 may be notified of the information of the operating frequency of the arithmetic processing unit 412 of the detachable device 100, for example, in step S906 or, for example, when the detachable device 100 is mounted in the image capturing apparatus 110. In addition, for example, as the information representing the performance, the control unit 304 can obtain the multiplication value k by reading out information stored in the storage unit 503 or from, for example, the phase locked loop circuit of hardware of the detachable device 100. The number of clock cycles of analysis processing is, for example, stored in the storage unit 503 in association with analysis processing, and the control unit 304 can obtain the number of clock cycles corresponding to execution target processing from the storage unit 503. In this way, in step S906, the detachable device 100 notifies the image capturing apparatus 110 of information having an arbitrary format and capable of specifying the processing time of the execution target processing.

In addition, when inputting one or more divided images to the detachable device 100 and executing predetermined analysis processing using the one or more divided images at once, the detachable device 100 may notify the image capturing apparatus 110 of information capable of specifying the processing time of each divided image. For example, the detachable device 100 can notify the image capturing apparatus 110 of a value T as the processing time for one divided image. In this case, the image capturing apparatus 110 can specify, as the time until completion of whole processing, dT obtained by multiplying the number d of divided images by the notified processing time T. Note that the one or more divided images to be processed at once can be some or all of images obtained by image capturing. That is, processing may be performed at once for one or more divided images which constitute some of images obtained by image capturing, or processing may be performed at once for a plurality of divided images which constitute all the obtained images. In this case, the number divided images as the target of batch processing is specified as the above-described number d of divided images. Alternatively, for example, when performing processing of integrating processing results after processing of each divided image, the detachable device 100 may further notify the image capturing apparatus 110 of a time T0 of processing such as integration. In this case, the image capturing apparatus 110 can specify, for example, the time until completion of overall processing, as dT+T0. In addition, the image capturing apparatus 110 may be notified of the information of the number of clock cycles for each of processing of each divided image or processing such as integration. Note that when continuously executing a plurality of processes, for example, the image capturing apparatus 110 may be notified of information capable of specifying the processing time until completion of each of the plurality of processes, or the processing time until completion of all of the plurality of processes. In any case, the image capturing apparatus 110 obtains information capable of specifying the processing time until completion of whole processing executed by the detachable device 100. The image capturing apparatus 110 then executes calculation as needed and specifies the processing time.

After that, the control unit 304 controls the device communication unit 306 to transmit the pre-analysis processing result to the detachable device 100 (step S907). For example, the control unit 304 issues a write request (write command) of the pre-analysis processing result, thereby transmitting the image of the pre-analysis processing result to the detachable device 100. The control unit 304 controls the device communication unit 306 to transmit an execution target processing request to the detachable device 100 (step S908). In the image capturing apparatus 110, the control unit 304 stops the processing and waits by the length of the processing time specified based on the information obtained from the detachable device 100 (step S909). On the other hand, in the detachable device 100, the communication unit 502 outputs the image of the pre-analysis processing result received in step S907 to the analysis unit 501, and the analysis unit 501 executes the execution target processing set in step S810 of FIG. 8 for the image (step S910). The analysis unit 501 stores the processing result at, for example, an address assigned to each processing in the storage unit 503.

The control unit 304 resumes the processing after the elapse of the processing time. The control unit 304 then controls the device communication unit 306 to request the analysis processing result of the detachable device 100 (step S911), and the communication unit 502 of the detachable device 100 notifies the image capturing apparatus 110 of information representing the result (step S912). For example, the control unit 304 controls the device communication unit 306 to issue a read request (read command) to the address at which the analysis processing result is stored and obtain the information of the processing result stored at the address. After that, the control unit 304 of the image capturing apparatus 110 controls the device communication unit 306 to receive the analysis processing result from the detachable device 100. After that, the control unit 304 controls the analysis unit 305 to execute post-analysis processing for the analysis processing result (step S913).

(Execution Control of Post-Processing)

Figure 10:
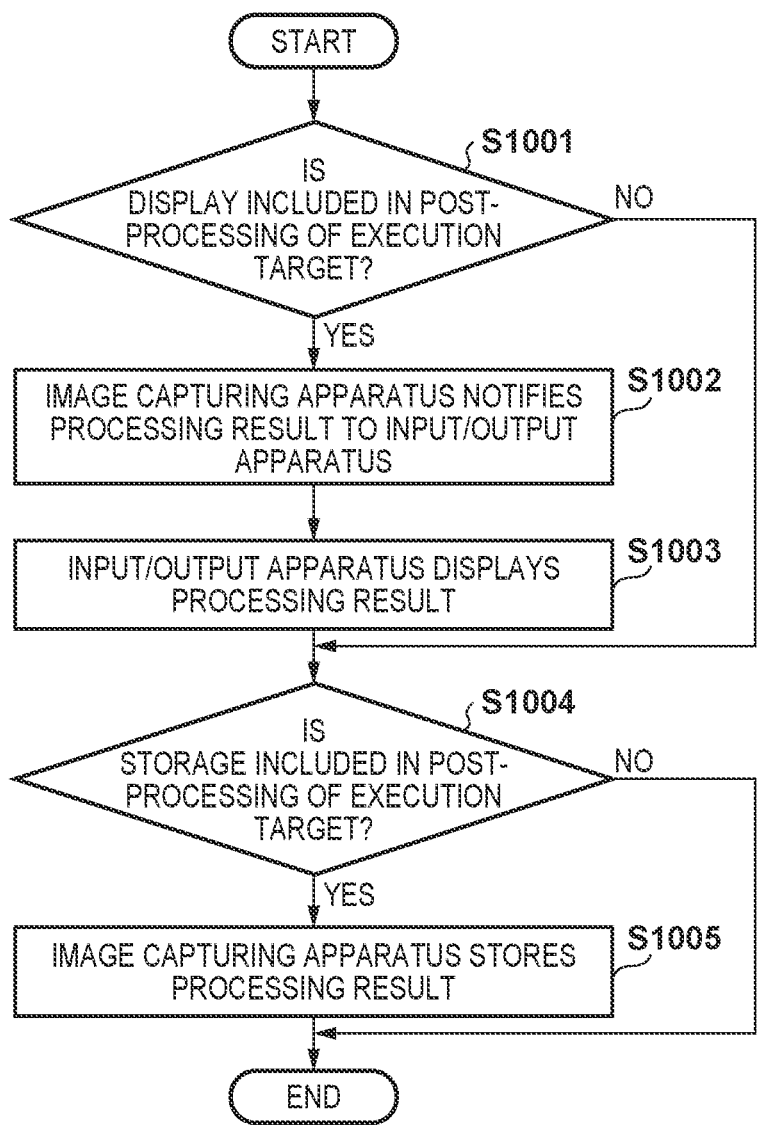
FIG. 10 is a flowchart showing an example of the procedure of control of executing post-processing.

FIG. 10 shows an example of the procedure of control when the image capturing apparatus 110 executes post-processing. In this processing, the control unit 304 of the image capturing apparatus 110 determines whether "display" is included in the execution target post-processing (step S1001). Upon determining that display is included in the execution target post-processing (YES in step S1001), the control unit 304 controls the network communication unit 307 to transmit the result of analysis processing to the input/output apparatus 130 (step S1002). The input/output apparatus 130 receives the result of analysis processing from the image capturing apparatus 110, and then presents the result of analysis processing to the user by screen display or the like (step S1003). On the other hand, if the control unit 304 determines that display is not included in the execution target post-processing (NO in step S1001), the processes of steps S1002 and S1003 are not executed.

In addition, the control unit 304 of the image capturing apparatus 110 determines whether "storage" is included in the execution target post-processing (step S1004). Note that the determination of step S1004 may be executed before step S1001 or may be executed in parallel to the step S1001. Upon determining that storage is included in the execution target post-processing (YES in step S1004), the control unit 304 controls the storage unit 303 to store the result of analysis processing and ends the processing. On the other hand, upon determining that storage is not included in the execution target post-processing (NO in step S1004), the control unit 304 ends the processing without executing the process of step S1005.

As described above, in accordance with the selected post-processing, the image capturing apparatus 110 can execute transfer of the result of analysis processing to the input/output apparatus 130 or storage in the storage unit 303 without accepting a special setting operation of the user and improve the convenience.

In this embodiment, as described above, when causing the detachable device 100 to execute analysis processing partially or wholly, the image capturing apparatus 110 obtains the processing time after the execution requests of the processes are issued until the processes are completed (by executing calculation and the like as needed). The image capturing apparatus 110 waits after image data (pre-processing result) for the processing is input, and execution of processing is requested until the obtained processing time elapses, and reads out the processing result after that. In the arrangement in which the detachable device 100 cannot automatically output the processing result after the end of the processing, this allows the image capturing apparatus 110 to obtain the processing result at an appropriate timing. Since, for example, processing result read processing is performed immediately after the completion of the processing (or after the elapse of a sufficiently short time after the completion of the processing), the processing to be cooperatively executed by the image capturing apparatus 110 and the detachable device 100 can be speeded up. Additionally, it is possible to prevent the image capturing apparatus 110 from attempting to obtain the processing result before the completion of the processing and prevent unnecessary memory access.

Note that in this embodiment, the time from the processing request to the completion of the processing is defined as the processing time. However, for example, the elapsed time from the starting point set to the timing of inputting processing target data such as a pre-processing result for a divided image to the completion of the processing may be defined as the processing time. In this case, for example, the processing of transmitting/receiving the processing execution request in step S908 may not be performed, and analysis processing is automatically started in response to input of the processing target data. The image capturing apparatus 110 can transmit the processing target data to the detachable device 100, wait by the processing time from the completion of the transmission, and then read out the processing result. Since transmission/reception of the processing execution instruction is omitted, the number of times of command transmission/reception can be decreased, and the processing efficiency can be improved. Note that in this form, it can be said that the processing target data write command is used as the processing execution request. That is, the processing execution request command may be issued separately from the processing target write command, or the processing target write command may serve as the processing execution request command. Not the timing of the command but the timing of actually starting processing in the detachable device 100 may be set to the starting point, and the elapsed time from the timing to the completion of the processing may be defined as the processing time. As described above, the elapsed time from a timing arbitrarily set in association with the start of processing to the completion of the processing can be defined as the processing time.

Additionally, in this embodiment, when the image capturing apparatus 110 causes the detachable device 100 to start processing, the processing time concerning the processing is obtained. However, the present invention is not limited to this. For example, when the detachable device 100 is mounted in the image capturing apparatus 110, information capable of specifying the processing time may be included in, for example, information to be read out by the image capturing apparatus 110 to determine whether the detachable device 100 is a predetermined device in step S702. According to this, information need only be read out only once when the detachable device 100 is mounted. Hence, the number of times of command transmission/reception can be decreased, and the processing efficiency can be improved.

In the above-described embodiment, image analysis processing has been described as an example of analysis processing. However, the present invention is also applicable to sound analysis processing. For example, the present invention can be applied to processing of detecting a sound pattern such as a scream, a gunshot, or glass breaking sound. For example, a characteristic amount of a sound is extracted by various sound data analysis methods such as spectrum analysis and compared with the detected sound pattern. By calculating the degree of matching, a specific sound pattern can be detected.

When performing sound analysis processing, sound data is divided into sound data of a predetermined time, sound analysis processing is performed using the sound data of the predetermined time as a unit. In addition, the predetermined time appropriately changes depending on the sound pattern of the detection target. For this reason, sound data of a time corresponding to a sound pattern to be detected is input to the detachable device 100. The detachable device 100 has a function of analyzing the input sound data or a function of holding the input sound data.

In the above-described embodiment, the detachable device 100 capable of non-temporarily storing data input from the image capturing apparatus 110 has been described as an example. However, in some embodiments, the detachable device 100 that cannot non-temporarily store data input from the image capturing apparatus 110 may be used. That is, the detachable device 100 may only perform analysis processing for data input from the image capturing apparatus 110, and may not non-temporarily store the data. In other words, the detachable device 100 aiming not at storing data, like a normal SD card, but at only analysis processing may be used.

<Modification>

In the above-described embodiment, a method of improving efficiency when causing the detachable device 100 to execute processing in a case in which the image capturing apparatus 110 can obtain the processing time in the detachable device 100 in advance has been described. On the other hand, the actual processing time in the detachable device 100 may be longer than the obtained processing time because of, for example, a factor such as a voltage drop or an environment in which the image capturing apparatus 110 is arranged. If the actual processing time is longer, the image capturing apparatus 110 may perform, for the detachable device 100, an attempt to obtain the processing result before completion of execution target processing. In this modification, if the actual processing time is longer than the obtained processing time, the processing result is obtained after the completion of execution target processing. This method will be described below.

Figure 11:
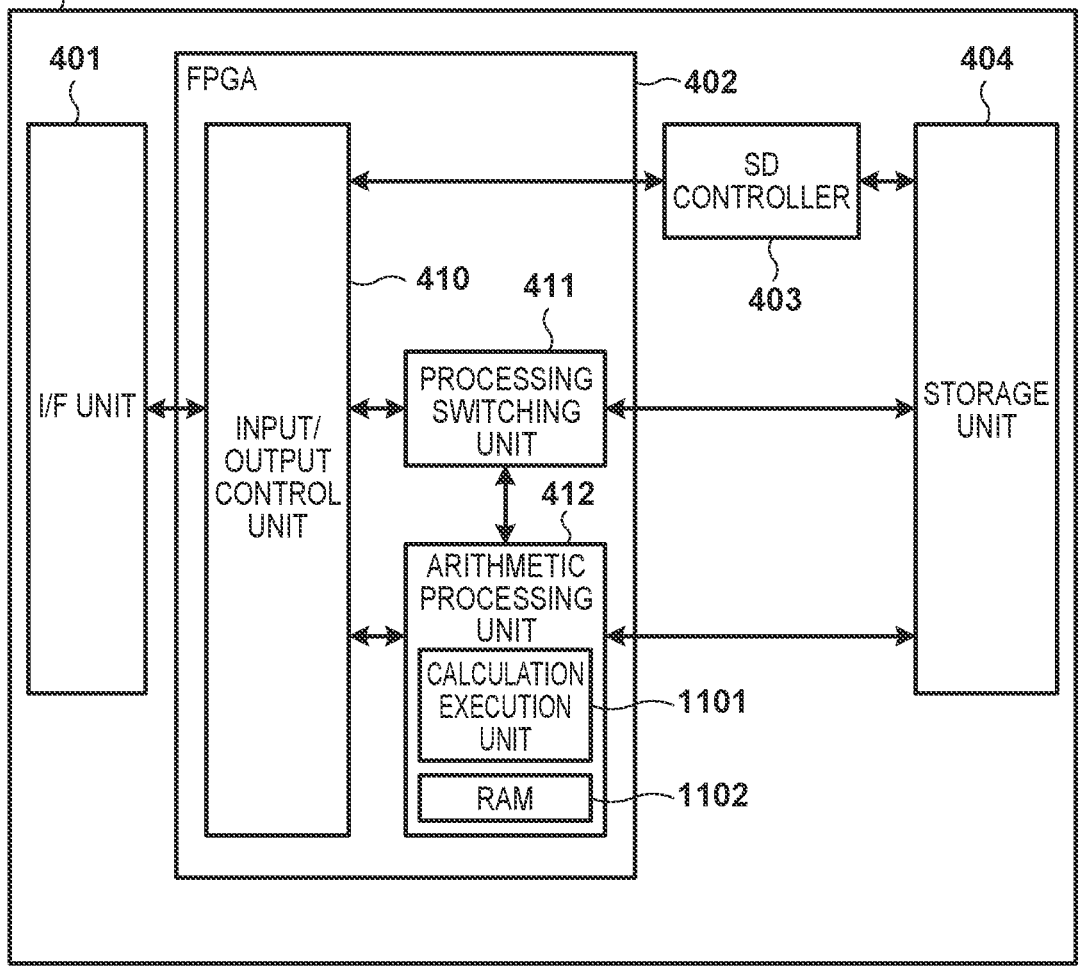
FIG. 11 is a block diagram showing an example of the hardware arrangement of a detachable device according to a modification.

FIG. 11 shows an example of the hardware arrangement of the detachable device 100 according to this embodiment. As shown in FIG. 11, in this embodiment, the arithmetic processing unit 412 includes a single or a plurality of calculation execution units 1101, and a single or a plurality of RAMs 1102. Each processing executable by the detachable device 100 can be constructed by, for example, combining a plurality of partial processes. Here, for example, at least some of the plurality of calculation execution units 1101 can be formed by circuits that execute different partial processes. Note that some of the calculation execution units 1101 may be configured to parallelly execute a common partial process for different data. The plurality of calculation execution units 1101 may be connected to each other, or may be connected to, for example, a RAM for temporary recording. Each partial process is associated with an index representing the processing order in the execution target processing (the order of the partial process in the execution target processing), a command representing the type of the operation to be executed, and a weight representing the coefficient of the operation to be executed. In this case, the index, the command, and the weight associated with the partial process are stored in the storage unit 404, and deployed on the RAM 1102. The calculation execution unit 1101 accesses the RAM 1102 and obtain the command of the operation, thereby executing the corresponding partial process. However, the present invention is not limited to this, and, for example, the index of the partial process may not exist. In this case, the command and weight of the operation are deployed on the RAM 1102 in accordance with the order of processing.

(Communication Between Image Capturing Apparatus 110 and Detachable Device 100)

Communication between the image capturing apparatus 110 and the detachable device 100 will be described here. The arithmetic processing unit 203 of the image capturing apparatus 110 and the SD controller 403 of the detachable device 100 are connected by a power supply line, a GND line, a clock line, a command line, and a data line via the device insertion socket of the SD I/F unit 205 of the image capturing apparatus 110. Note that the clock line, the command line, and the data line are connected via the FPGA 402. On the clock line, a synchronization clock output from the arithmetic processing unit 203 is communicated. On the command line, a command issued for an operation request from the arithmetic processing unit 203 to the SD controller 403 and a response to the command from the SD controller 403 to the arithmetic processing unit 203 are communicated. On the data line, write data from the arithmetic processing unit 203 and read data from the detachable device 100 are communicated. In addition, the arithmetic processing unit 203 discriminates High and Low of a device detect signal of the device insertion socket of the SD I/F unit 205, thereby recognizing whether the detachable device 100 is inserted.

The arithmetic processing unit 203 issues a command to the SD controller 403 on the command line after power supply. Upon receiving a response from the SD controller 403 and output data representing device information as an SD card, the arithmetic processing unit 203 sets a voltage for data communication, a communication speed (clock frequency), and the like.

Figure 12A:
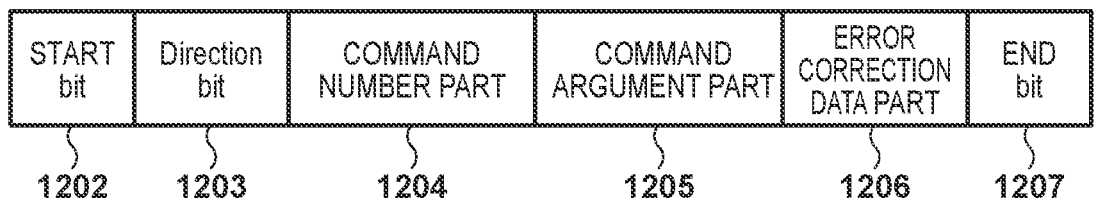
FIGS. 12A and 12B are views showing the structures of a command and a response.
Figure 12B:
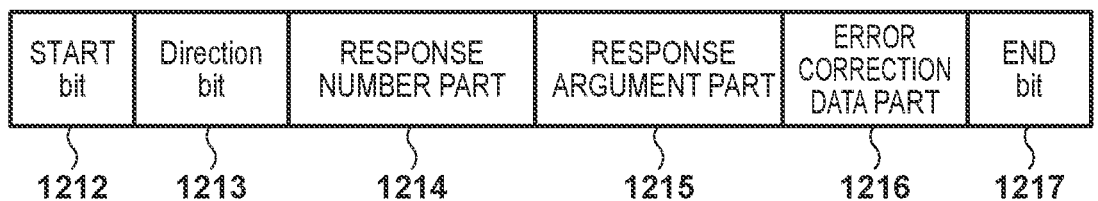

FIGS. 12A and 12B show the structures of a command and a response communicated on the command line. The command and response have structures complying with the SD standard. A command 1201 issued from the arithmetic processing unit 203 to the SD controller 403 is configured to include a command number part 1204, a command argument part 1205, and an error correction data part 1206. In the command number part 1204, a value indicating the type of the command is described. For example, if a value "23" is stored in the command number part 1204, this indicates that the command is a block count designation command for designating the number of data blocks. If a value "25" is stored in the command number part 1204, this indicates that the command is a multi-write command. If a value "12" is stored in the command number part 1204, this indicates that the command is a data transfer stop command. In the command argument part 1205, pieces of information such as the number of transfer data blocks and the write/read address of a memory are designated in accordance with the type of the command. A command start bit 1202 representing the start position of the command is added to the first bit of the command, and a command end bit 1207 representing the end of the command is added to the final bit of the command. Additionally, a direction bit 1203 representing that the command is a signal output from the image capturing apparatus 110 to the detachable device 100 is also added after the command start bit 1202.

A response 1211 returned from the SD controller 403 in response to the command from the arithmetic processing unit 203 includes a response number part 1214 representing for which command the response is returned, a response argument part 1215, and an error correction data part 1216. A response start bit 1212 representing the start position of the response is added to the first bit of the response, and a response end bit 1217 representing the end position of the response is added to the final bit of the response. Additionally, a direction bit 1213 representing that the response is a signal output from the detachable device 100 to the image capturing apparatus 110 is also added after the response start bit 1212. In the response argument part 1215, pieces of information such as the status of the SD card are stored in accordance with the command type.

A method of transmitting/receiving data between the arithmetic processing unit 203 and the detachable device 100 will be described next. In the SD I/F unit 205, data transfer is performed on a block basis in both data write and read.

The following two methods are used by the arithmetic processing unit 203 to transfer the data of a plurality of blocks to the detachable device 100. In the first method, after the number of blocks is designated by a block count designation command for transfer data, data of the designated number of blocks are transferred by a multi-write command. In the block count designation command, the number of blocks of write data is designated by the command argument part 1205. In the multi-write command, the address of the storage unit 404 at which the data should be written is designated by the command argument part 1205. In the second method, data transfer is started by issuing a multi-write command without issuing a block count designation command. When the data transfer ends, a transfer stop command is issued, thereby ending the processing. At this time, the command argument part 1205 of the multi-write command designates only the address of the storage unit 404 at which the data should be written. The arithmetic processing unit 203 can arbitrarily switch the two write methods.

Note that when performing storage processing, the FPGA 402 directly inputs a command and data sent from the arithmetic processing unit 203 to the SD controller 403, and the SD controller 403 stores the received data at the address of the storage unit 404 designated by the command. When performing image analysis processing, the FPGA 402 executes analysis processing for data sent from the arithmetic processing unit 203, and outputs the data of the processing result and information for designating a predetermined address of the storage unit 404 to the SD controller 403. The SD controller 403 stores the processing result at the designated address of the storage unit.

The following two methods are used by the arithmetic processing unit 203 to read out the data of a plurality of blocks from the detachable device 100. In the first method, after the number of blocks is designated by a block count designation command, a multi-read command is issued, and data of the designated number of blocks are read out. In the block count designation command, the number of blocks of read data is designated by the command argument part 1205. The command argument part 1205 of the multi-read command designates the address of the memory of the data read source. In the second method, data read is started by issuing a multi-read command without issuing a block count designation command, and the processing is ended by issuing a transfer stop command. The arithmetic processing unit 203 can arbitrarily switch the two read methods.

Note that if write data or read data is data of one block, a single-write command or a single-read command is issued, thereby executing data write or read without issuing a block count designation command and a transfer stop command. In the single-write command and the single-read command as well, the command argument part 1205 designates the address of the storage unit 404 of the access target, as in the above description.

The arithmetic processing unit 203 performs write to the detachable device 100, thereby transmitting data as the target of storage processing or image analysis processing to the detachable device 100. In addition, the arithmetic processing unit 203 performs read from the detachable device 100, thereby obtaining image data stored in the storage unit 404, a processing result of image analysis processing, and the information of the image analysis processing function held by the detachable device 100.

Figure 13:
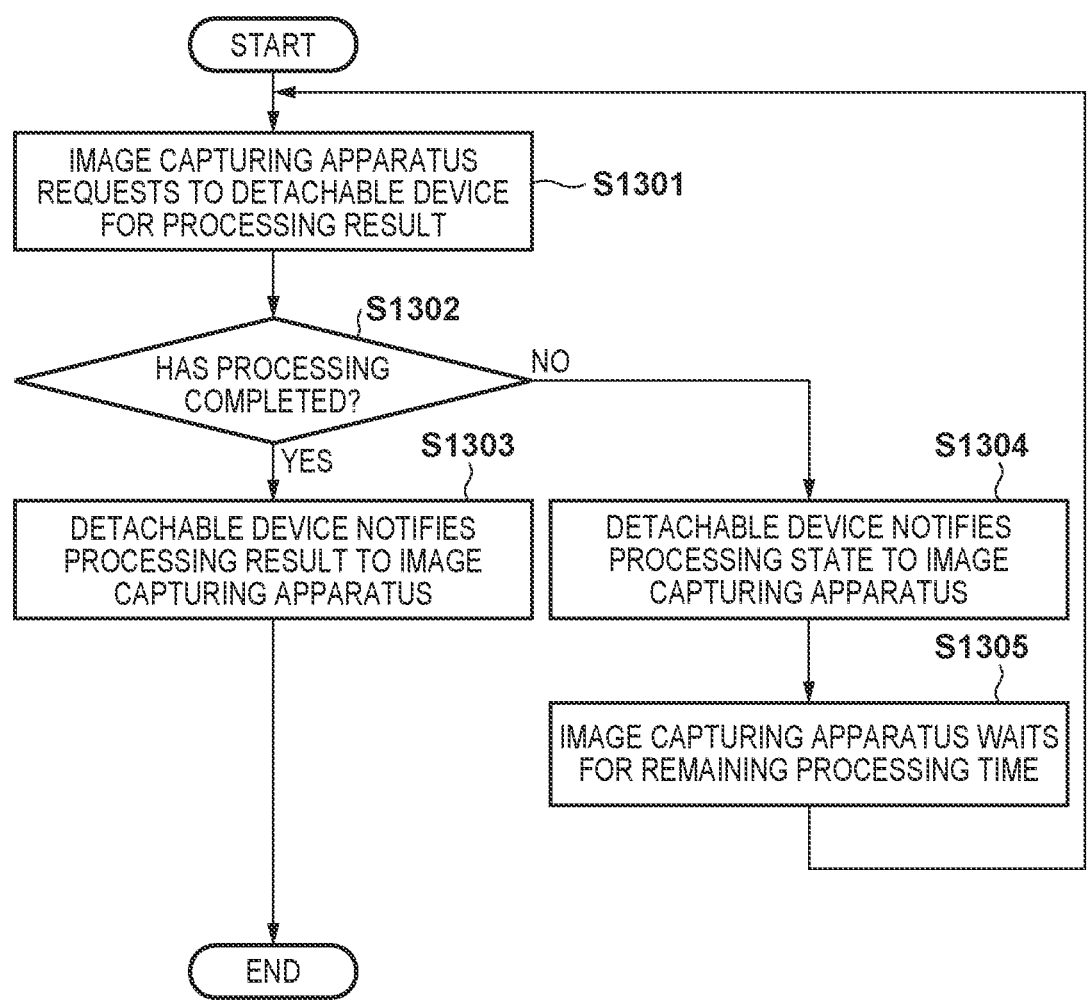
FIG. 13 is a flowchart showing an example of the procedure of result obtaining processing considering a case in which processing is uncompleted.

In this modification, in a case in which the image capturing apparatus 110 requests the processing result from the detachable device 100 in step S911, even if the processing is not completed, the detachable device 100 efficiently notifies the image capturing apparatus 110 of the processing result. In this processing, if the processing is not completed yet when receiving the request of the processing result, the detachable device 100 notifies the image capturing apparatus 110 of the state of the processing, and the image capturing apparatus 110 waits for a predetermined time in accordance with the state of the processing and then requests the processing result again. If the processing is not completed, the wait time is set in consideration of the state of the processing of the detachable device 100. It is therefore possible to prevent unnecessary waiting for a long time while lowering the probability that the processing is not completed yet when the processing result is requested next. An example of the procedure of this processing will be described below with reference to FIG. 13.

In this processing, first, in the image capturing apparatus 110, the control unit 304 controls the device communication unit 306 to request a processing result from the detachable device 100 (step S1301). The detachable device 100 receives the processing result using the communication unit 502, and determines whether the analysis unit 501 has completed the execution target processing (step S1302). Upon determining that the analysis unit 501 has completed the execution target processing (YES in step S1302), the detachable device 100 notifies the image capturing apparatus 110 of the processing result using the communication unit 502 (step S1303), and ends the processing. On the other hand, upon determining that the analysis unit 501 has not completed the execution target processing (NO in step S1302), the detachable device 100 notifies the image capturing apparatus 110 of the information of a processing state representing the situation of processing execution by the analysis unit 501 using the communication unit 502 (step S1304). Based on the information of the processing state obtained from the detachable device 100, the image capturing apparatus 110 calculates the remaining processing time, and waits by the remaining processing time (step S1305). After the elapse of the remaining processing time, the image capturing apparatus 110 requests the processing result from the detachable device 100 again (step S1301). At this point of time, the time assumed to be needed from the processing state notified in step S1304 to the completion of the processing has elapsed. Hence, by the re-request of the processing result, the image capturing apparatus 110 can obtain the processing result from the detachable device 100 at a sufficiently high probability.

Note that the information of the processing state can be, for example, the index of the partial process that is being executed by the analysis unit 501. However, the present invention is not limited to this, and the information of the processing state may be information having another format and capable of specifying the progress situation of the processing. For example, since the information associated with the partial process is deployed on the RAM 1102, the value of the address of the RAM 1102 accessed by the calculation execution unit 1101 may be used as the information of the processing state. Alternatively, for example, the information of the processing state may be information representing whether the execution target processing is completed. Also, the information of the processing state may include, for example, a value indicating the remaining processing time. That is, the remaining processing time in the processing that is currently being executed by the detachable device 100 may be specified, and the detachable device 100 may notify the image capturing apparatus 110 of the specified remaining processing time as the information of the processing state.

The notification of the processing state by the detachable device 100 according to this modification can be made using a portion assumed to be a reserved area by the SD standard in the data area of the response to the processing result request command. However, the present invention is not limited to this, and, for example, the information of the processing state may be included before information representing the processing result in the response on the data line to the processing result request command. That is, as the response to the processing result request command, the information of the processing state can be transmitted independently of whether the processing is completed or not. In this case, in the data transmitted from the detachable device 100, an area to store the processing result is prepared in advance as an area of a predetermined size. The image capturing apparatus 110 can handle, as the processing result, data of a predetermined size from the end in the data received from the detachable device 100, and handle the remaining data as the processing state. Alternatively, the information of the processing state may be included after the information representing the processing result in the response on the data line to the processing result request command. Note that if the processing is not completed, an invalid value such as a value of all 0s can be included in the area to store the processing result. The image capturing apparatus 110 may handle, as the processing state, data before a predetermined pattern in the data received from the detachable device 100, and handle data after the predetermined pattern as the processing result.

In this modification, the image capturing apparatus 110 can calculate the remaining processing time by the product of the time elapsed after the start of the processing and the value of a ratio including, as the numerator, the index of the partial process that is being executed by the analysis unit 501 and, as the denominator, the total number of partial processes. For example, assume that N partial processes exist, and indices 0 to N−1 are assigned to the N partial processes in the execution order. That is, the partial process of index 0 is executed first, the partial process of index 1 is executed next, the partial process of index 2 is executed next, . . . , and the partial process of index N−1 is executed finally. At this time, assume that an index n is notified as the information of the processing state. In this case, the partial process of index n is also being executed, and n partial processes of indices 0 to n−1 are completed. Here, let T be the elapsed time. Since the n partial processes are completed in the elapsed time T, the expected value of the time needed for one partial process is T/n. Since the total number of partial processes is N, N×(T/n) is estimated as the time until the end of all partial processes. The image capturing apparatus 110 can calculate, as the remaining processing time, (N/n−1)×T obtained by subtracting the elapsed time T from the start of processing from the time until all the partial processes end. Here, the detachable device 100 can store the total number of partial processes, and the image capturing apparatus 110 can obtain the information of the total number of partial processes from the detachable device 100. Note that as for the remaining processing time, for example, in the detachable device 100, the calculation execution unit 1101 may access the RAM 1102 and execute the calculation as described above, and the image capturing apparatus 110 may obtain the result of the calculation from the detachable device 100.

Additionally, if the information of the processing state is the value of the address of the RAM 1102 accessed by the calculation execution unit 1101, the remaining processing time can be specified based on the address value of the RAM 1102 accessed by the calculation execution unit 1101. For example, the range of the storage unit 404 in which the data of the execution target processing is stored is determined in advance, and the information of the first partial process is stored within a predetermined range (for example, a range of a size S) from the start address in the range. The next process is stored in a predetermined range (a range of the size S) immediately after the range where the information of the first partial process is stored, the next process is stored immediately after the predetermined range, . . . , and the information of the final partial process is stored immediately in a predetermined range at the end of the range. In this way, the size of the data of the execution target processing can correspond to the range of the storage unit 404 in which the data is stored. At this time, for example, assume that the start address is A, the size of the data of the execution target processing is K×S, and A+k×S is designated as the information of the processing state. In this case, it can be specified that K partial processes exist in total, and the processing is completed up to the kth (the index is k−1) partial process. For this reason, letting T be the elapsed time after the start of the processing, the remaining processing time is (K/k−1)×T, as in the above-described case. This calculation is equivalent to the calculation ((K×S)/(k×S)−1)×T based on the address. Note that k×S is specified as a value obtained by subtracting the start address A of the range to store the data concerning the execution target processing from the address A+k×S notified as the information of the processing state. In this way, the remaining processing time can be calculated based on the information of the address that designates the area to store the information associated with the partial process that is currently being executed.

The remaining processing time may be specified not based on, for example, the processing state but as the product of the elapsed time T and a predetermined coefficient. Here, the coefficient is set to, for example, 1 or less in advance. Note that in each of the above-described calculation methods of the remaining processing time, the processing time of which the detachable device 100 has notified the image capturing apparatus 110 in step S906 may be used in place of the elapsed time T.

In this modification, as described above, when the image capturing apparatus 110 requests a processing result from the detachable device 100, if the processing is completed, the detachable device 100 notifies the image capturing apparatus 110 of the processing result, and if the processing is not completed, the detachable device 100 notifies the image capturing apparatus 110 of the information of the processing state. If the information of the processing state represents that the processing is uncompleted, the image capturing apparatus 110 specifies the remaining processing time and waits by the remaining processing time. After waiting by the remaining processing time, the image capturing apparatus 110 executes the processing result request again. In the arrangement in which the detachable device 100 cannot automatically (actively) output the processing result after the end of the processing, this allows the image capturing apparatus 110 to obtain the processing result at an appropriate timing. Since, for example, processing result read processing is performed immediately after the completion of the processing (or after the elapse of a sufficiently short time after the completion of the processing), the processing to be cooperatively executed by the image capturing apparatus 110 and the detachable device 100 can be speeded up.

Note that in this modification, an example in which if the execution target processing is not completed, the detachable device 100 notifies the image capturing apparatus 110 of the information of the processing state when the image capturing apparatus 110 requests the analysis processing result from the detachable device 100 has been described. However, the present invention is not limited to this. For example, the image capturing apparatus 110 may request the information of the processing state before requesting the analysis processing result from the detachable device 100. If the information of the processing state is requested, the detachable device 100 notifies the image capturing apparatus 110 of the information of the processing state. After that, if the information of the processing state represents that the execution target processing is completed, the image capturing apparatus 110 requests the processing result from the detachable device 100, and the detachable device 100 notifies the image capturing apparatus 110 of the processing result. If the information of the processing state represents that the execution target processing is not completed, the image capturing apparatus 110, for example, waits by the period calculated in the above-described way. After the wait, the image capturing apparatus 110 can request the processing state from the detachable device 100 again, and the detachable device 100 can notify the image capturing apparatus 110 of the processing state again.

Note that unless the information of the processing state representing that the execution target processing is completed is obtained, the image capturing apparatus 110 repeats waiting by the calculated time and requesting the processing result. However, the present invention is not limited to this, and, for example, if processing has not progressed for a predetermined period, the image capturing apparatus 110 may determine that an error has occurred. For example, if the index representing a partial process that is being executed continuously a plurality of times exhibits no change, the image capturing apparatus 110 can determine that an error has occurred. Additionally, for example, if the length of the wait time calculated in the above-described way exceeds a predetermined length, the image capturing apparatus 110 can determine that an error has occurred. Hence, if processing does not end in the detachable device 100 because of, for example, loop of the processing, it can be specified that the image capturing apparatus 110 is in an error state.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-197653, filed Oct. 30, 2019 and Japanese Patent Application No. 2020-061113, filed Mar. 30, 2020 which are hereby incorporated by reference herein in their entirety.

What is claimed is:

1. A device that complies with a predetermined standard and that is mounted in an image capturing apparatus, comprising:
   at least one processing circuit; and
   at least one memory that stores a computer-readable instruction for causing, when executed by the at least one processing circuit, the device to;
   execute analysis processing; and
   transmit, to the image capturing apparatus, information including a number of clock cycles corresponding to a processing time from a start of the analysis processing to completion of the analysis processing.

2. The device according to claim 1, wherein the computer-readable instruction further causes the device to receive, from the image capturing apparatus, commands corresponding to the predetermined standard.

3. The device according to claim 2, wherein the information is transmitted in a case where a predetermined command is received from the image capturing apparatus.

4. The device according to claim 2, wherein the processing time indicates a time from a timing of receiving, from the image capturing apparatus, a command for requesting execution of the analysis processing to the completion of the analysis processing.

5. The device according to claim 1, wherein the information is transmitted in a case where the device is mounted in the image capturing apparatus.

6. The device according to claim 1, wherein the analysis processing is at least one of human body detection processing, face detection processing, characteristic amount matching processing, or sound analysis processing, and
   the processing time is associated with the analysis processing.

7. The device according to claim 1, wherein the processing time indicates a time from a timing of receiving, from the image capturing apparatus, an image for the analysis processing to the completion of the analysis processing.

8. The device according to claim 1, wherein information of a processing state representing an execution status of the analysis processing is transmitted.

9. The device according to claim 8, wherein the information of the processing state is information representing a progress status of the analysis processing.

10. The device according to claim 9, wherein the progress status is represented by an address of a memory accessed by the analysis processing.

11. The device according to claim 10, wherein a remaining processing time is calculated based on the address and an area of the memory used by the analysis processing.

12. The device according to claim 10, wherein the analysis processing is formed by a plurality of partial processes, and
   the progress status is represented by which one of the plurality of partial processes is being executed.

13. The device according to claim 9, wherein in a case where the analysis processing is not completed, the information of the processing state is transmitted to the image capturing apparatus.

14. The device according to claim 8, wherein in a case where the information of the processing state representing the execution status of the analysis processing represents that the analysis processing is completed, a result of the analysis processing is transmitted to the image capturing apparatus.

15. The device according to claim 1, wherein the predetermined standard is SD standard formulated by the SD Association.

16. A control method executed by a device that complies with a predetermined standard and that is mounted in an image capturing apparatus, comprising:
   executing analysis processing;
   transmitting, to the image capturing apparatus, information including a number of clock cycles corresponding to a processing time from a start of the analysis processing to completion of the analysis processing.

17. A non-transitory computer-readable storage medium that stores a program configured to cause a processor provided in a device that complies with a predetermined standard and that is mounted in an image capturing apparatus, to:
   execute analysis processing;
   transmit, to the image capturing apparatus, information including a number of clock cycles corresponding to a processing time from a start of the analysis processing to completion of the analysis processing.

* * * * *